(12) United States Patent
Haag et al.

(10) Patent No.: US 10,272,814 B2
(45) Date of Patent: Apr. 30, 2019

(54) GRAVEL BOXES, CONTAINERS WITH ROLLING ROOFS, AND RELATED METHODS

(71) Applicant: Environmental Metal Works Ltd., Two Hills (CA)

(72) Inventors: Lindsay Haag, Two Hills (CA); Konstantin Guenter, St. Paul (CA); Cornelio Neufeld, Hairy Hill (CA); John Diachuk, Two Hills (CA); Daniel Guenter, St. Paul (CA); Bernhard Peters, Two Hills (CA)

(73) Assignee: Environmental Metal Works Ltd., Two Hills, Alberta ( * ) Notice: Subject to any disclaimer, the term of this patent is extended or adjusted under 35 U.S.C. 154(b) by 36 days.

(21) Appl. No.: 15/275,091

(22) Filed: Sep. 23, 2016

(65) Prior Publication Data

US 2018/0086186 A1    Mar. 29, 2018

(51) Int. Cl.
*B60P 1/28* (2006.01)
*B60J 7/02* (2006.01)
*B60J 7/04* (2006.01)

(52) U.S. Cl.
CPC .................. *B60P 1/28* (2013.01); *B60J 7/028* (2013.01); *B60J 7/041* (2013.01)

(58) Field of Classification Search
CPC ............. B60P 1/28; B60J 7/042; B60J 7/0573
USPC ............ 296/100.01, 100.03, 100.05, 100.04, 296/100.06, 100.1, 100.07, 183.2
See application file for complete search history.

(56) References Cited

U.S. PATENT DOCUMENTS

| | | | |
|---|---|---|---|
| 4,489,810 A | 12/1984 | Curtis | |
| 4,934,562 A | 6/1990 | Early et al. | |
| 5,133,586 A * | 7/1992 | Anderson | B60J 7/041 105/377.09 |
| 5,755,351 A | 5/1998 | Kruzick | |
| 6,364,153 B1 | 4/2002 | Petzitillo, Jr. et al. | |
| 9,061,623 B2 | 6/2015 | MacLean et al. | |
| 2009/0273209 A1* | 11/2009 | Joab | B60J 1/1884 296/215 |

(Continued)

FOREIGN PATENT DOCUMENTS

| | | |
|---|---|---|
| CA | 1072465 | 2/1980 |
| CA | 1237994 | 6/1988 |

(Continued)

OTHER PUBLICATIONS

GRTE18S-P2312 SICK Photoelectric Sensors, published at least as early as Aug. 9, 2016, 8 pages.

(Continued)

*Primary Examiner* — Joseph D. Pape
(74) *Attorney, Agent, or Firm* — Lorelei G. Graham

(57) ABSTRACT

Gravel boxes, open top containers with rolling roofs, and related methods. The rolling roof is used to cover open top containers for dry or liquid loads. The rolling roof may be manually operated with a ratcheting handle or motor in combination with two rolling mechanisms placed on each side of the roof. The rolling roof mechanism may be implemented by sliding the roof either to the left or to the right side of the container, and turning it from a horizontal position to a vertical position along the side wall. Such allows loading from either side of the container by using the full area of the opening.

22 Claims, 28 Drawing Sheets

(56) References Cited

U.S. PATENT DOCUMENTS

2013/0249236 A1* 9/2013 Smith ................... B60J 7/085
296/98
2014/0353308 A1* 12/2014 MacLean .............. B60P 3/2235
220/1.5

FOREIGN PATENT DOCUMENTS

| CA | 2412120 A1 * | 6/2004 | ............. B60P 1/283 |
| CA | 2709598 | 1/2012 | |
| CA | 2869262 | 5/2016 | |

OTHER PUBLICATIONS

Thomson Electrak HD electric actuators, URL=http://www.design-engineering.com/products/linear-actuators-4/, accessed on Aug. 10, 2016, 3 pages.

\* cited by examiner

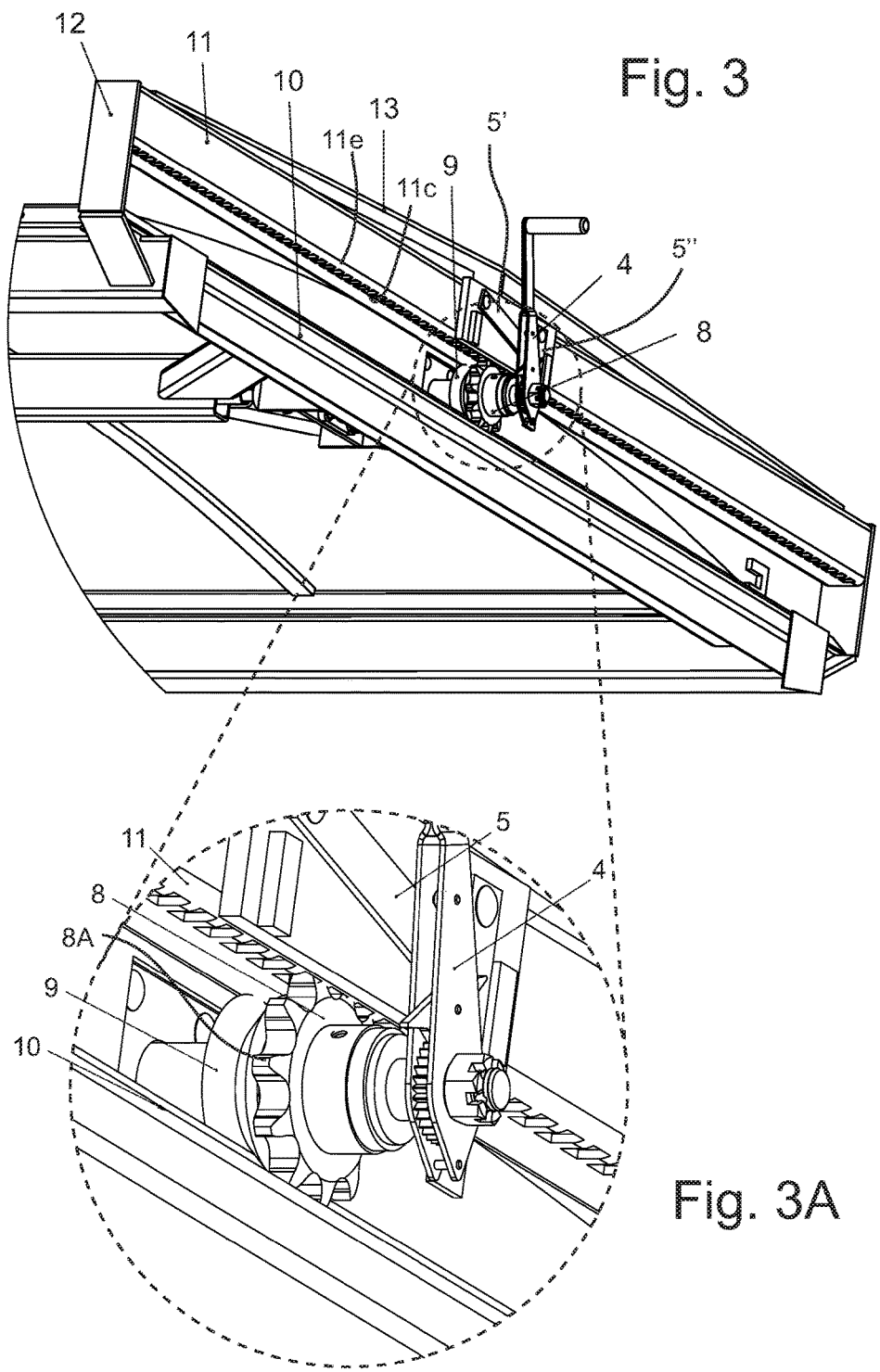

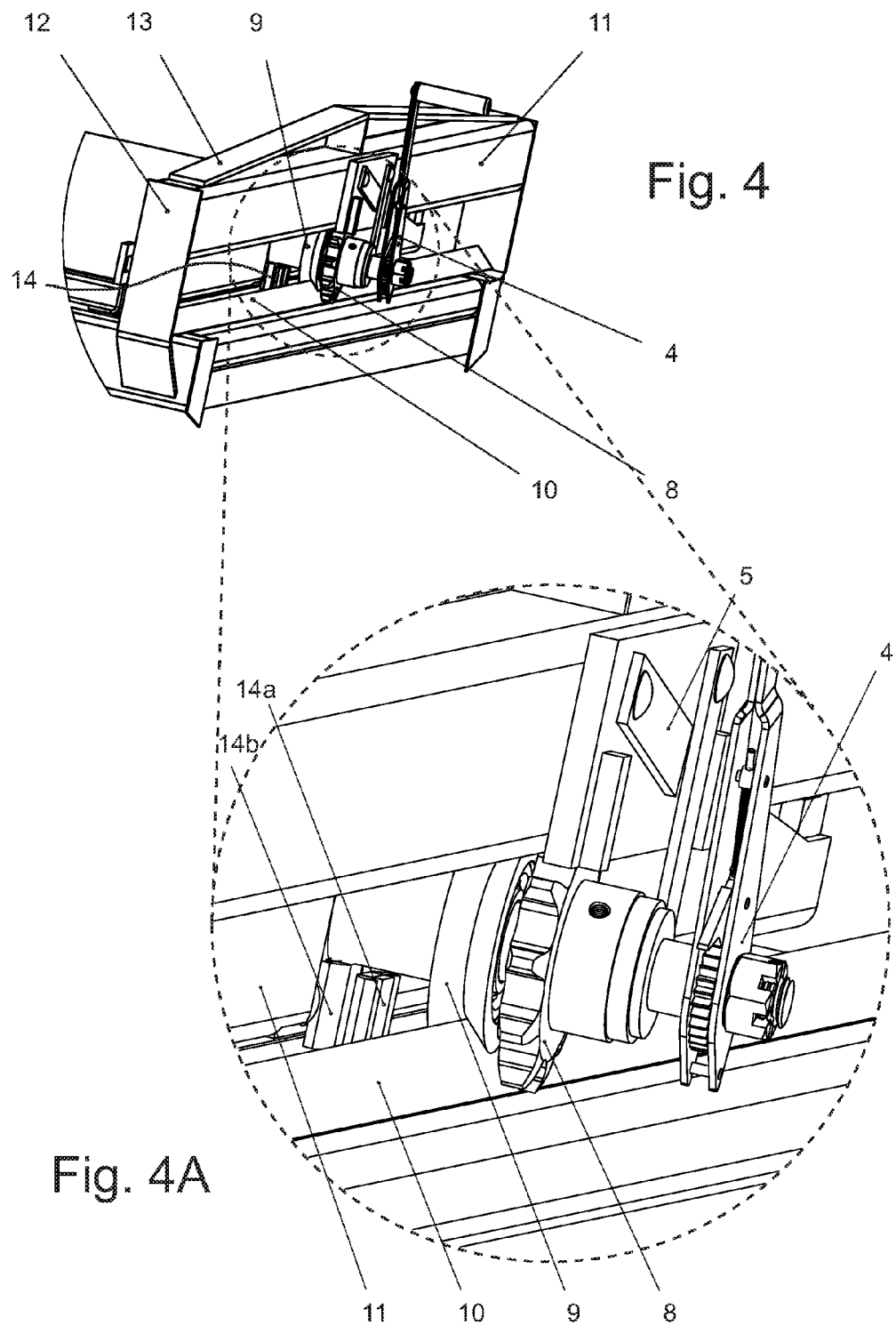

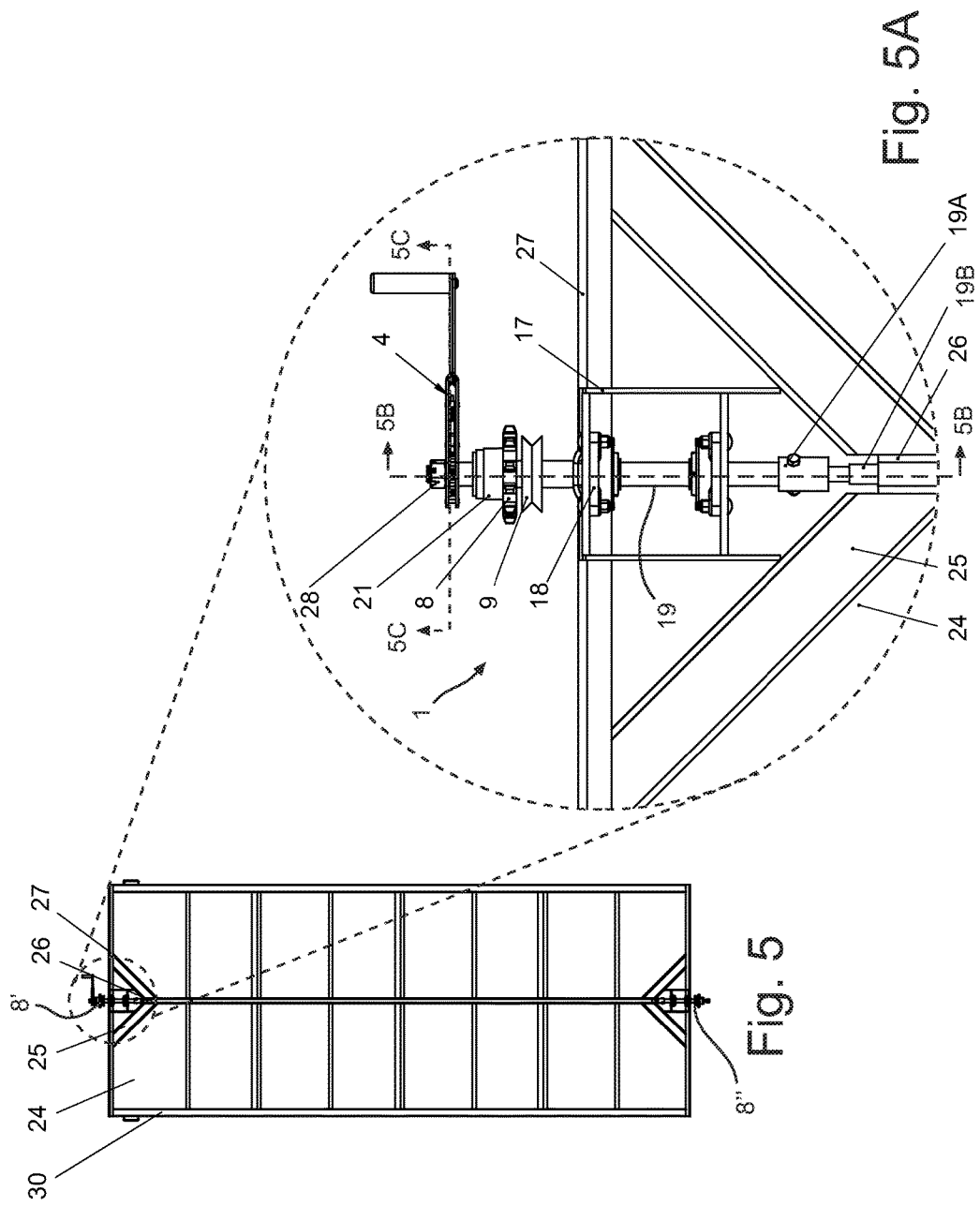

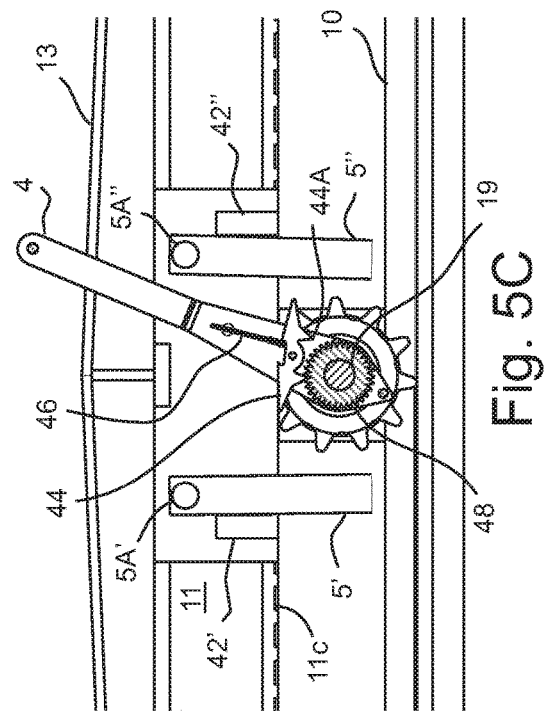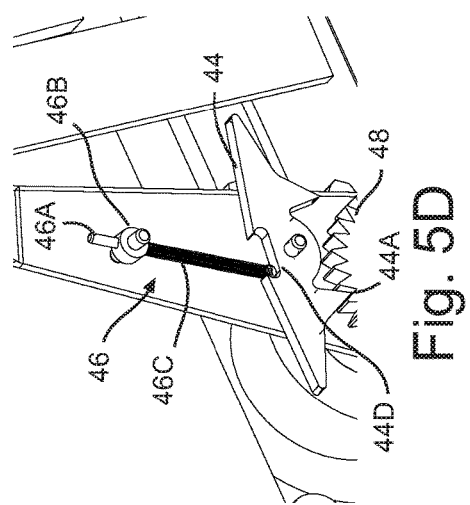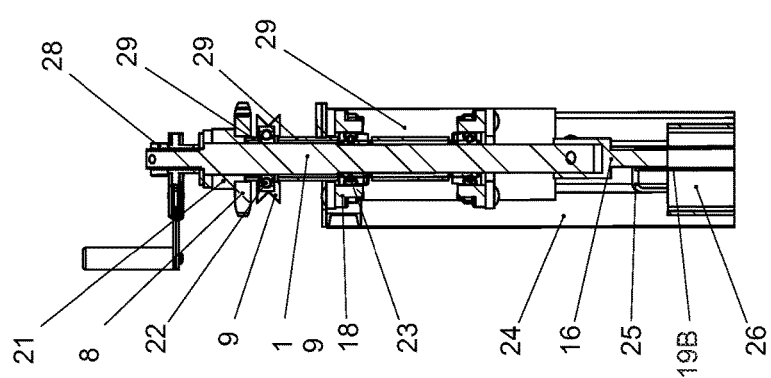

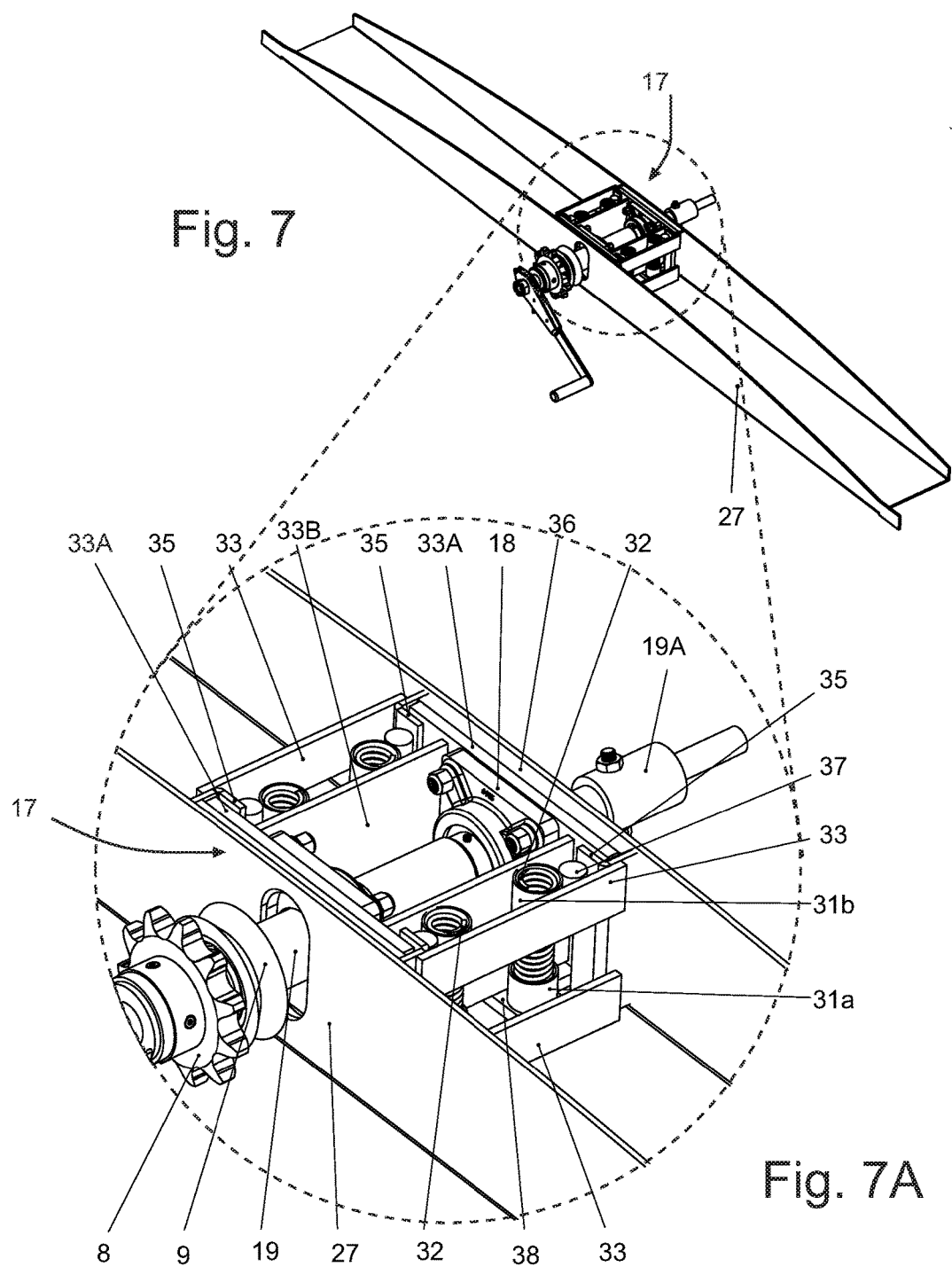

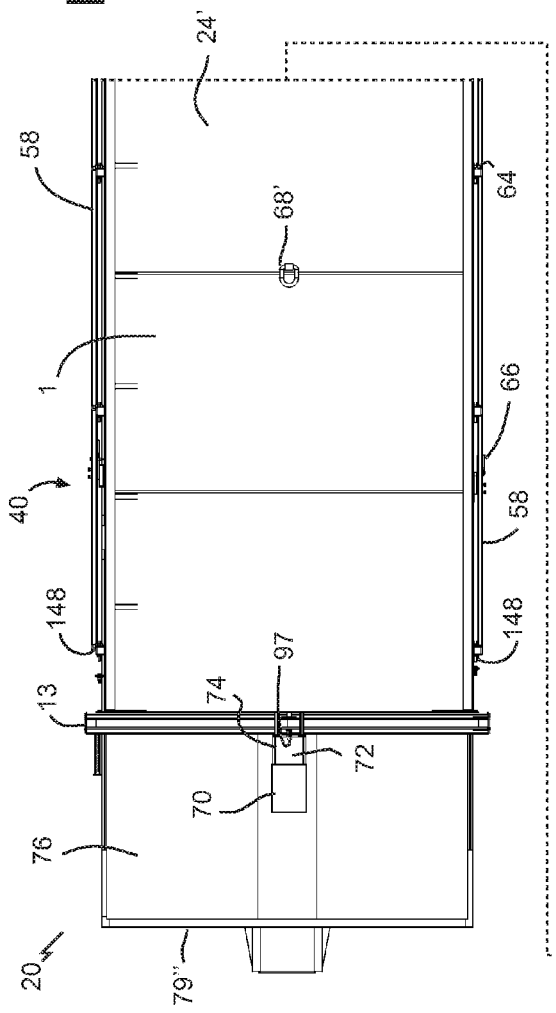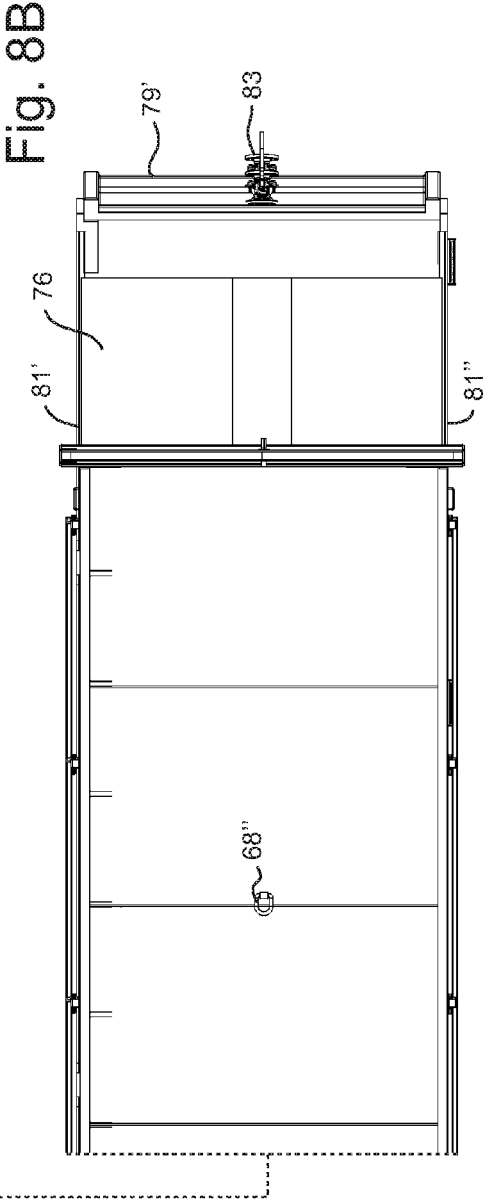

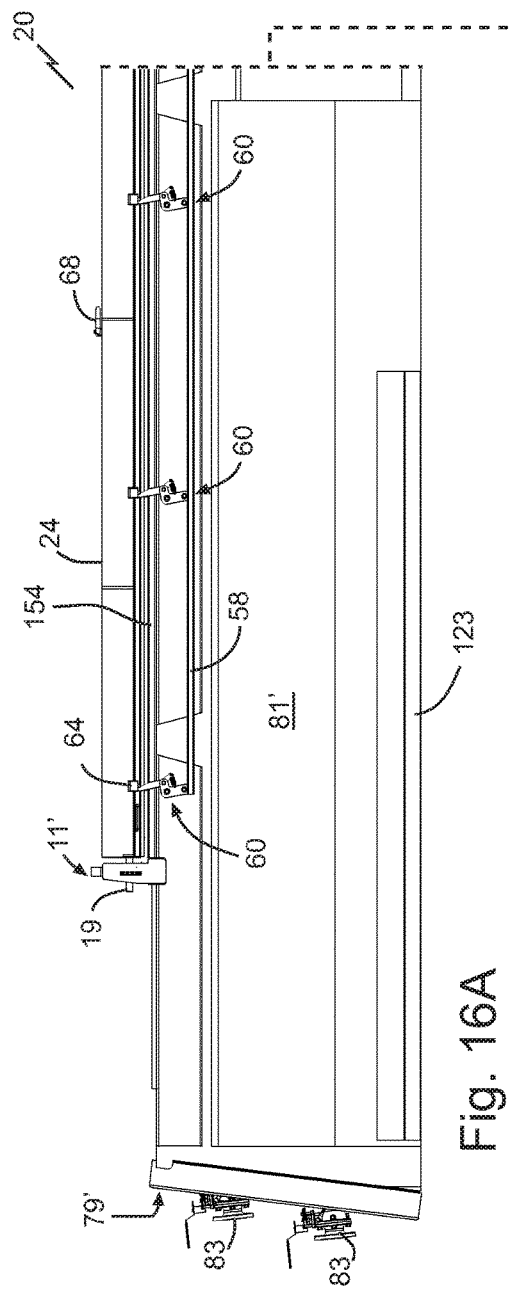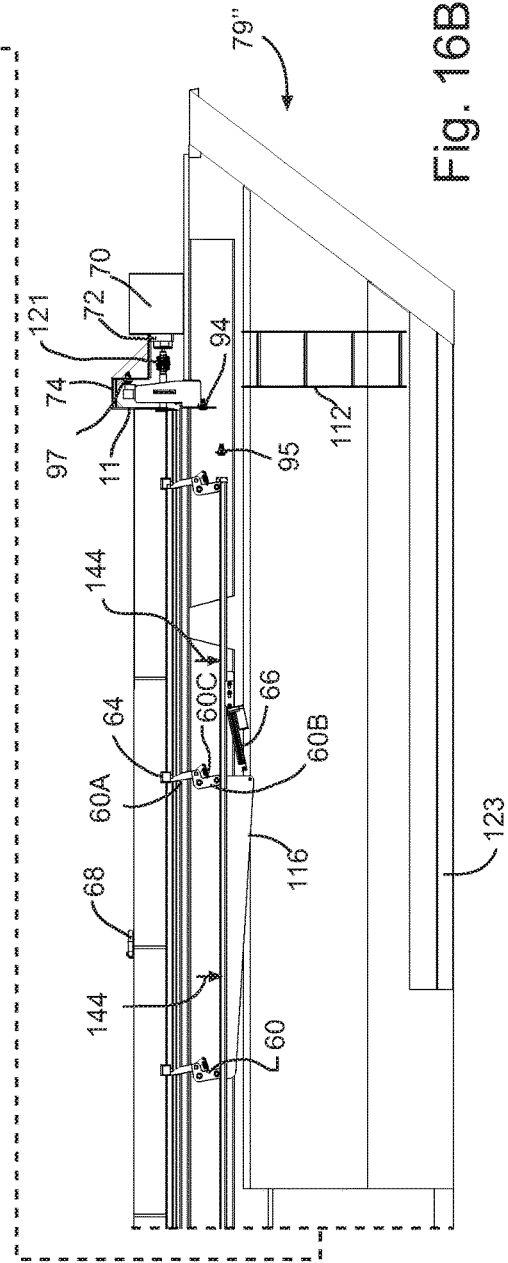

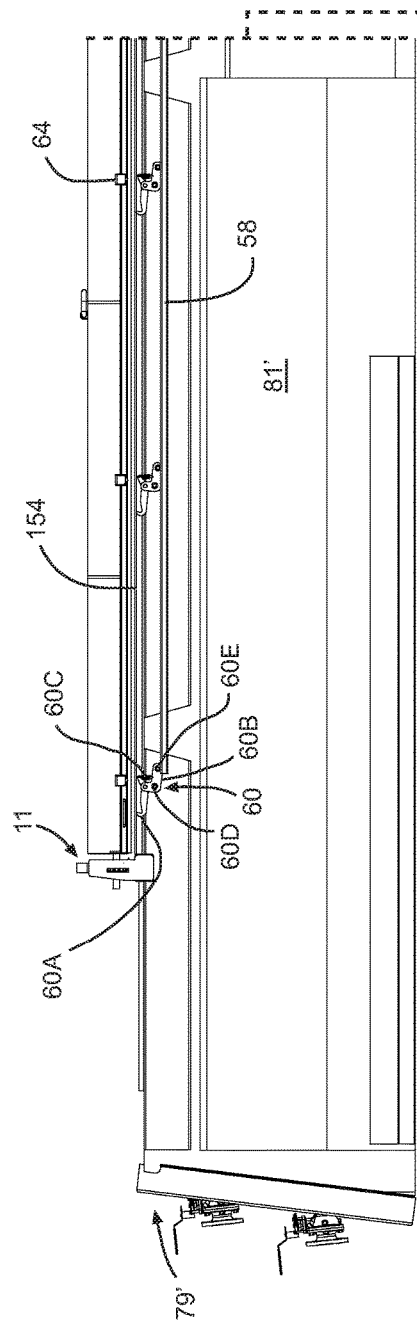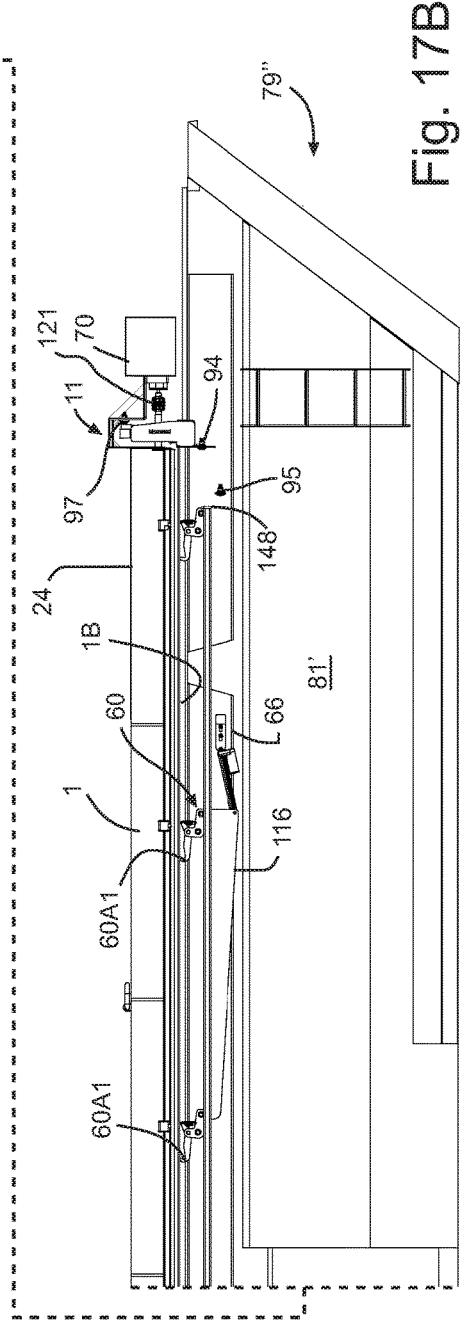

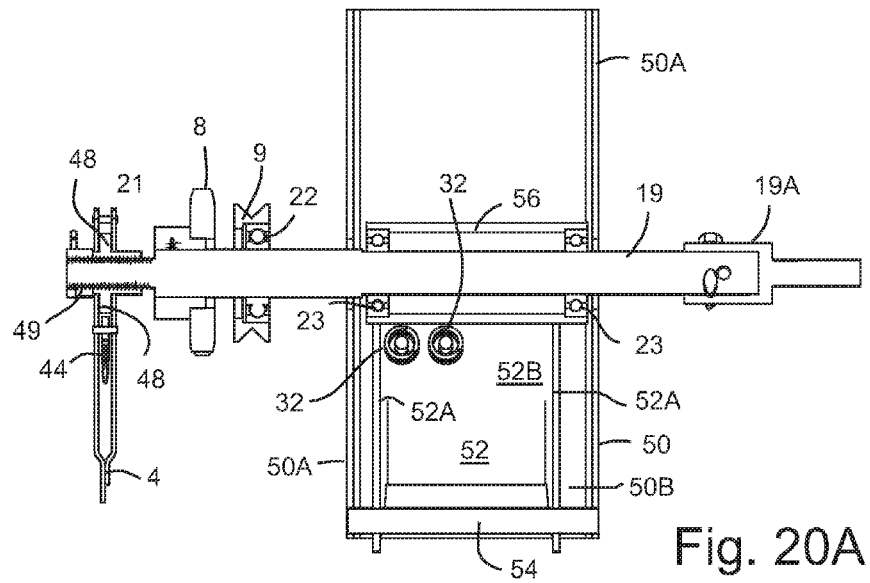
Fig. 20A1
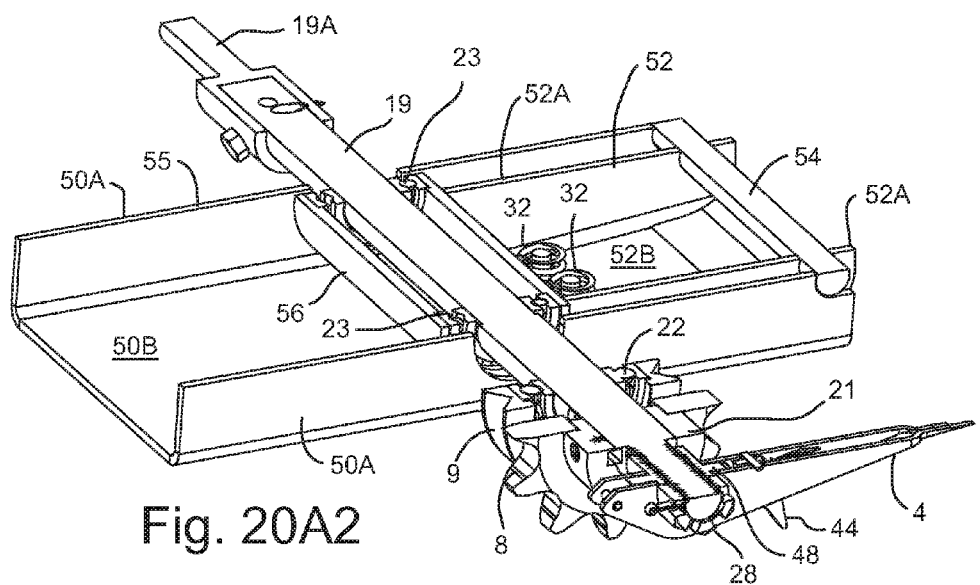
Fig. 20A2

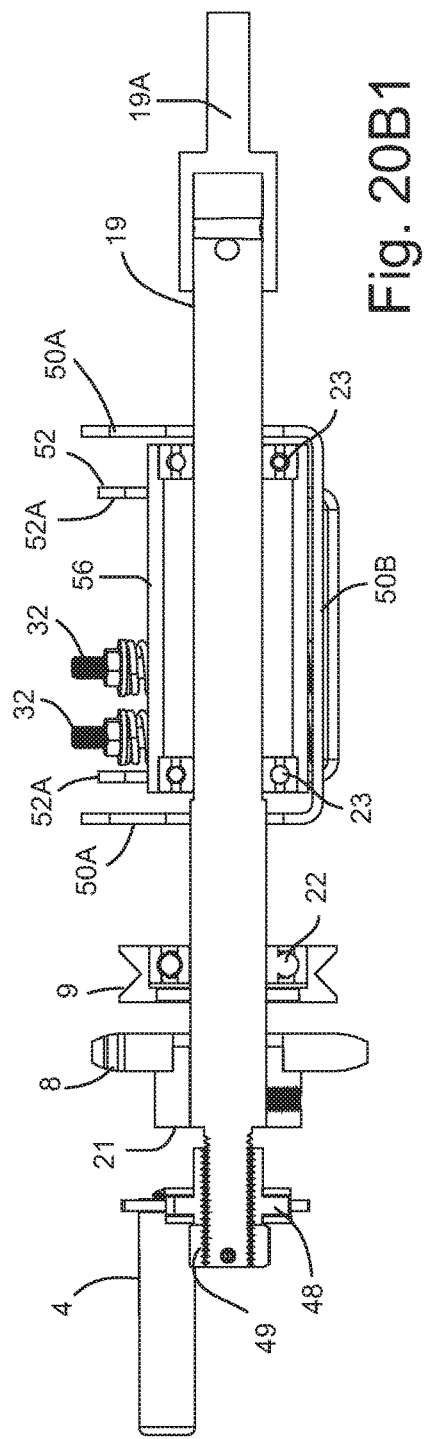
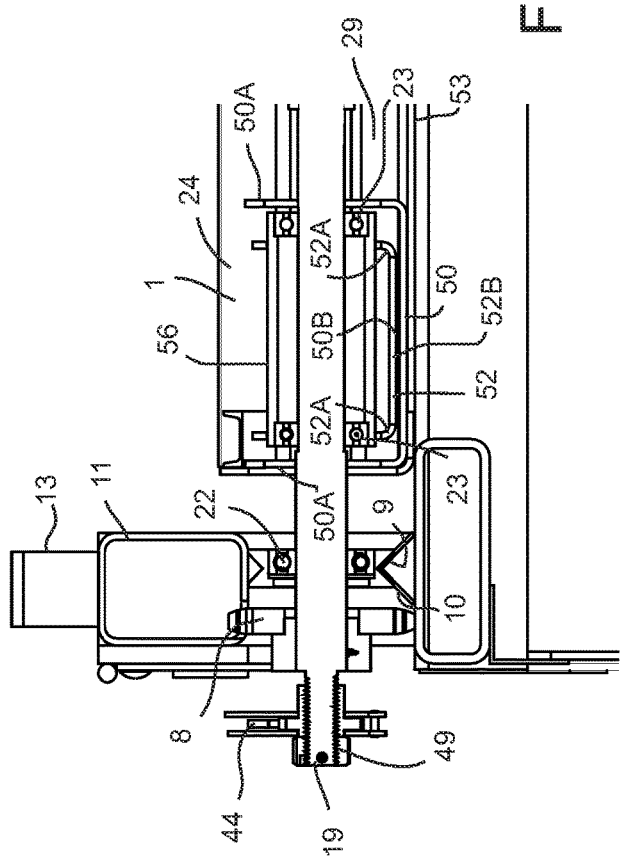

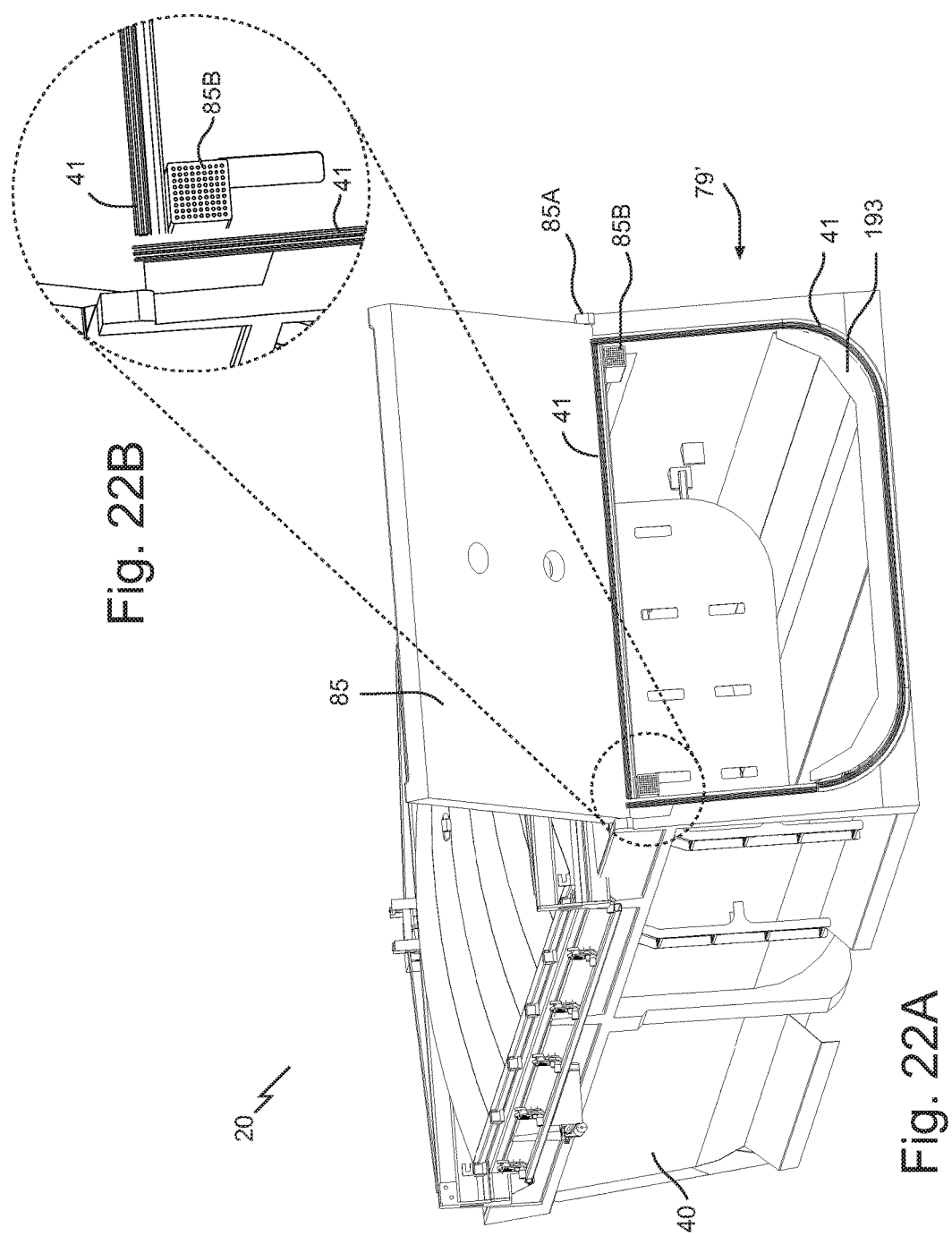

GRAVEL BOXES, CONTAINERS WITH ROLLING ROOFS, AND RELATED METHODS

TECHNICAL FIELD

The present disclosure covers various types of containers, including open top containers for dry loads and liquids, and having a rolling roof.

BACKGROUND

Rolling roofs are known that operate via a manual hand crank, see for example Canadian patent application no. 2,709,598.

SUMMARY

An apparatus is disclosed comprising: an open top container; a track mounted to the open top container between opposed side walls of the open top container; and a roof mounted by an axle to the track to permit the roof to, in use, slide along the track from a closed position to one of the opposed side walls of the open top container and then be rotated about the axle into an open position.

An apparatus is comprising: an open top container; a track mounted to the open top container between opposed side walls of the open top container; a roof mounted by an axle to the track to permit the roof to, in use, slide along the track from a closed position to one of the opposed side walls of the open top container and then be rotated about the axle into an open position; and an actuator connected to slide the roof along the track and rotate the roof into the open position.

An apparatus is disclosed comprising: an open top container; a track mounted to the open top container between opposed side walls of the open top container; a roof mounted by an axle to the track to permit the roof to, in use, slide along the track from a closed position to either side of the open top container and then be rotated about the axle into an open position, in which the axle is mounted to the roof by a compressible part that permits the roof to move in a vertical direction relative to the axle; and a tensioner for securing the roof against the open top container when the roof is in the closed position.

An apparatus is disclosed comprising: an open top container; a track mounted to the open top container between opposed side walls of the open top container; a roof mounted by an axle that rolls along the track to permit the roof to, in use, slide along the track from a closed position to either side of the open top container and then be rotated about the axle into an open position; and a ratcheting handle connected to rotate the axle relative the track to slide the roof along the track.

An apparatus is disclosed comprising: an open top container; a track assembly mounted to the open top container between opposed side walls of the open top container, the track assembly forming a rack; and a roof mounted by a pinion assembly that rolls along the rack to permit the roof to, in use, slide along the rack from a closed position to either side of the open top container and then be rotated about the pinion assembly into an open position; and in which the track assembly comprises opposed tracks that are rigidly connected at a fixed distance relative to one another, at all positions between longitudinal ends of the rack, to retain the pinion in contact with the rack.

An apparatus is disclosed comprising: an open top container; a track mounted to the open top container between opposed side walls of the open top container; a roof mounted by an axle to the track to permit the roof to, in use, slide along the track from a closed position to either side of the open top container and then be rotated about the axle into an open position; and a bar mounted to the track to move into and out of an axle blocking position where the axle is prevented from sliding the roof out of the closed position.

An apparatus is disclosed comprising: an open top container; a plate mounted to the open top container between opposed side walls of the open top container, the plate having a series of holes that are spaced along a longitudinal length of the plate to form a rack; and a roof mounted by a pinion that rolls along the rack to permit the roof to, in use, slide along the plate from a closed position to either side of the open top container and then be rotated about the pinion into an open position.

In some embodiments of a rolling roof, a ratcheting handle may be applied in the operation as a lever to reduce applied manual force, and an equilibrium system may be involved to upend the entire roof in a vertical and reverse in horizontal position, which also reduces the applied manual force. Some embodiments of a rolling roof permit convenient manipulation of a broad range of lid sizes and weights for various container types while preserving safe operation.

According to some embodiments of the disclosure, the rolling roof comprises two identical rolling mechanisms on each side of the roof that are connected by a pipe and coupler. The rolling mechanism may include a flange-mounted bearing assembly, sprocket-wheel, and V roller, which are connected concentric to the shaft. The flange-mounted bearing assembly may bear an axle load of the shaft and facilitate rotational motion concurrent with a sprocket-wheel and V roller. To impart longitudinal motion to the entire rolling roof, a manual turning of the ratcheting handle may be applied to activate the rotary motion of the sprocket-wheel along the structural tubing with holes, concurrent with the V roller that rotates along the L angle iron that is utilized as a guide lower track. Structural tubing with holes and L angle iron may be components of the track assembly that maintain the rolling roof alignment along the front and back end of the container. Also described are rolling mechanisms that may provide the entire rolling roof to slide to either side of the container and turn it to a vertical position to allow the use of the full loading area of the open top container.

Some embodiments of the disclosure provide an improved rolling roof for various types of open top containers. The rolling roof may be used to cover open top containers for any dry loads and a sealed rolling roof may be used to cover containers with dry or liquid loads. The rolling roof may be manually operated with a ratcheting handle in combination with two rolling mechanisms placed on each side of the roof. The rolling roof mechanism may operate by sliding the roof either to the left or to the right side of the container, and turning it from a horizontal to a vertical position along the side wall. This permits loading from either side of the container with access to the full area of the opening. This method may require minimum physical strength, eliminate the use of cable or winch lifting systems, and hence may have a higher degree of safety that is beneficial for various types of open top containers.

According to some embodiments of the disclosure, a rolling roof comprises two identical rolling mechanisms on the front and back sides (ends) of the roof that are connected by a pipe and coupler.

According to some embodiments of the disclosure, the rolling roof comprises two identical rolling mechanisms on each side of the roof that connect by a pipe and coupler. The rolling mechanism includes a flange-mounted bearing assembly, sprocket-wheel, and V roller, which connected concentric to the shaft. The flange-mounted bearing assembly bears axle load of the shaft and has applied to it rotational motion concurrent with sprocket-wheel and V roller. To impart longitudinal motion to the entire rolling roof, a manual turning of the ratcheting handle applies rotary motion to linearly drive the sprocket-wheel along the structural tubing with holes, and concurrently the V roller rotates along an L angle iron that operates as a guide lower track. Structural tubing with holes and L angle iron are components of the track assembly that maintain the rolling roof aligned along the front and back end of the container. Also described are rolling mechanisms that permit the sliding of the entire rolling roof to either side of the container and turning it in a vertical position which allows one to access and use a full loading area of the open top container.

Methods of operating a rolling roof apparatus are also disclosed.

In various embodiments, there may be included any one or more of the following features: An actuator connected to slide the roof along the track. The actuator is connected to rotate the roof into the open position. The actuator comprises a motor. The motor is connected to rotate the axle. The motor is positioned adjacent a first longitudinal side of the track, and mounted to the roof via a support arm that extends over the track and anchors to the roof adjacent a second longitudinal side of the track. The support arm forms a cantilever. A roof position sensor or sensors. The roof position sensor or sensors comprise a plurality of photoelectric proximity sensors. The roof position sensor or sensors comprise one or both of: a first roof position sensor mounted to the roof or open top container for detecting the open position; and a second roof position sensor mounted to the roof or open top container for detecting the closed position. The roof position sensor or sensors are connected to reduce or shut off drive output from the motor when the roof moves into the open position. The roof position sensor or sensors are connected to reduce or shut off drive output from the motor when the roof moves into the closed position. A lock for securing the roof in the closed position. The lock comprises respective sets of latches along the opposed side walls. Each set of the respective sets of latches comprises: a common latch actuator; a plurality of pins; and a plurality of hooks that pivotally mount to the common latch actuator for engaging the plurality of pins. Each hook of the plurality of hooks is pivotally mounted to a respective one of the opposed side walls of the open top container, and each pin of the plurality of pins are mounted to the roof. Each set of the respective sets of latches have: an unlatched position where the plurality of hooks are positioned below a plane defined by a top perimeter rim of the open top container; and a latched position where the plurality of hooks engage respective pins of the plurality of pins. Each hook of the plurality of hooks has a first hook part pivotally mounted to the common latch actuator, and a second hook part pivotally mounted to the first hook part and defining a hook end for engaging a respective pin of the plurality of pins. Each common latch actuator comprises a drive bar mounted to a linear actuator. When in a latched position, the respective sets of latches are structured to apply a tension between the roof and open top container to draw the roof tightly against the open top container. A lock position sensor or sensors. The lock position sensor or sensors comprise a plurality of photoelectric proximity sensors. The lock position sensor or sensors are connected to reduce or prevent operation of the motor when the respective sets of latches are out of an unlatched position. The track forms a rack; and the axle comprises a pinion that rolls along and below the rack. The actuator comprises a drive shaft that mounts to the axle via a power transfer part that permits the drive shaft to move in a vertical direction relative to the axle. The power transfer part comprises a double universal joint. The actuator comprises a ratcheting handle connected to rotate the axle relative the track to slide the roof along the track. The ratcheting handle is adapted to ratchet in either direction. The ratcheting handle comprises a part that permits the ratcheting handle to be switched between a first ratcheting direction and a second ratcheting direction. The axle is mounted to the roof by a compressible part that permits the roof to move in a vertical direction relative to the axle. The axle is mounted by bearings to a first frame that is nested within or has nested within it a second frame that mounts to the roof, with the compressible part connecting the first frame and the second frame. The first frame and the second frame are pivotally connected to one another. The first frame has a U-shaped portion that nests within a U-shaped portion of the second frame. The compressible part comprises springs. The springs are each mounted on respective shafts with respective nuts for adjusting spring tension. A compressible seal between the open top container and the roof when the roof is in the closed position. The compressible seal is mounted around a perimeter edge of the roof. A tensioner for securing the roof against the open top container when the roof is in the closed position. The tensioner comprises tie down straps mounted to the open top container. The track forms a rack; and the axle comprises a pinion that rolls along the rack. The pinion comprises a sprocket. The track comprises opposed tracks that are rigidly connected at a fixed distance relative to one another, at all positions between axial ends of the rack, to retain the pinion in contact with the rack. The track comprises a plate, the plate having a series of holes that are spaced along a longitudinal length of the plate to form the rack. The plate is formed by a tube. A bar mounted to the track to move into and out of an axle blocking position where the axle is prevented from sliding the roof out of the closed position. The bar is mounted to swing into and out of the axle blocking position. The bar comprises a pair of bars located to the left and right of the axle when the roof is in the closed position. A pair of stops located to the left and right of each the pair of bars. Each bar hangs down across a path of the axle when in a respective axle blocking position of the bar, and each bar is mounted to swing toward the axle and up out of the path of the axle to move out of the respective axle blocking position. The track comprises a pair of parallel tracks adjacent opposed ends of the open top container, and the axle is mounted to roll along both of the pair of tracks. The roof is horizontal or near horizontal when in the closed position; the roof is horizontal or near horizontal when in a dangling position at either longitudinal end of the track; and the roof is vertical or near vertical when in the open position. A lock for securing the roof against an adjacent side wall of the open top container when the roof is in the open position. The lock comprises a chain and hook. The axle defines a central axis of the roof. A hinged door at a rear end of the open top container for dumping contents of the open top container; and a plurality of interior baffles within the open top container. An end-dump gravel box. The roof is mounted to the track to permit the roof to, in use: a) slide along the track from a closed position to a first of the opposed side walls of the open top container and then be rotated about the axle into a first open position; and b) slide along the track from a closed position to a second of the opposed side walls of the open top container and then be rotated about the axle into a second open position. Sliding the roof from the closed position to one of the opposed side walls of the open top container and then rotating the roof into the open position. Securing the roof to the one of the opposed side walls when the roof is in the open position. Rotating the roof from the open position into a horizontal dangling position and sliding the roof into the closed position. Securing the roof to the open top container in the closed position. The rolling mechanism includes a flange-mounted bearing assembly, sprocket-wheel, and V roller with integral ball bearing. The flange-mounted bearing assembly bears the axle load of a shaft and implements rotational motion. The sprocket-wheel fastens to the shaft which allows their concurrent rotation. The V roller is jointed to the shaft with integral ball bearing which allows it to rotate around the shaft. A structural tubing with holes in combination with sprocket is utilized as a rack-pinion mechanism that transmits a torque to rolling roof mechanism. To impart longitudinal motion to an entire rolling roof, a manual turning of a ratcheting handle applies which activates a rotary motion of the sprocket-wheel along the structural tubing with holes, concurrent the V roller rotates along L angle iron that utilizes as a guide lower track. The rotation of V rollers along L angle irons allows a linear motion of the rolling roof mechanisms on each roof's side that provides sliding the entire rolling roof to either side wall of the container and turning it in a vertical position.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a perspective view of the track assembly of the open top container in FIG. 1.

FIG. 3A is an enlarged detail perspective view of the track assembly in FIG. 3 showing parts of the rolling roof mechanism.

FIG. 4 is an alternate perspective view of the track assembly of the open top container in FIG. 1.

FIG. 4A is an enlarged detail perspective view of the track assembly in FIG. 4.

FIG. 5 is a top plan view of the open top container in FIG. 1.

FIG. 5A is an enlarged top plan view of the rolling roof assembly in FIG. 5

FIG. 5B is a section view taken along section lines 5B in FIG. 5A.

FIG. 5C is a section view taken along section lines 5C in FIG. 5A.

FIG. 5D is a perspective view of the portion of the rolling roof assembly in FIG. 5C.

FIG. 7 is a perspective view of the leak resistant bracket of an embodiment of the sealed rolling roof in FIG. 1.

FIG. 7A enlarged detail perspective view of the bracket in FIG. 7.

FIGS. 8A and 8B collectively form a top plan view of an embodiment of an open top container that forms a gravel box with a motorized rolling roof.

FIG. 13A is an enlarged detail perspective view of a corner of the rolling roof in FIG. 13 showing compressible seals and roof handle.

FIG. 13B is an enlarged detail perspective view of another corner of the rolling roof in FIG. 13 showing compressible seals and a roof hook.

FIGS. 16A and 16B collectively form a side elevation view of the open top container of FIGS. 8A and 8B, displaying side latches and actuator in a latched or locked position.

FIGS. 17A and 17B collectively form a side elevation view of the open top container of FIGS. 8A and 8B, displaying the side latches and actuator in an unlatched or fully disengaged position.

FIG. 20A1 is a section view taken along a horizontal plane through the bearing holder of FIG. 20.

FIG. 20A2 is a perspective view of the portion of the portion of the bearing holder shown in FIG. 20A1.

FIG. 20B1 is a section view taken along a vertical plane through the bearing holder of FIG. 20.

FIG. 20B2 is a section view taken along a central vertical plane through an open top container that incorporates the bearing holder of FIG. 20.

FIG. 22A is a perspective view of a rear end of the open top container of FIGS. 8A and 8B with a rear dump door in an open position.

FIG. 22B is an enlarged detail perspective view of the rear dump door of FIG. 22A, showing a compressible perimeter seal and vent box.

DETAILED DESCRIPTION

Immaterial modifications may be made to the embodiments described here without departing from what is covered by the claims.

Tractor trailer, rail car, and tanker units are used to transport fluids on a transportation route. Tractor trailer units incorporate a towing vehicle, commonly referred to as a tractor or truck, and one or more semi-trailers for carrying cargo on the road. A tanker typically has a sealed cylindrical tank lying horizontally on a truck bed and often includes an integral pumping system for pumping material in and out of the tank. Tankers may include additional features such as insulation, pressurization, and/or compartmentalization, depending on the cargoes being carried. Rail cars and tractor trailer units may carry skid mounted units, for example in the same or an analogous fashion as used to carry intermodal containers.

Tractor trailers, rail cars, and tankers are used to transport mixtures of liquids and solids such as in the form of a sludge or slurry. Example sludges and slurries include drilling muds, invert, drill cuttings and cement from oil and gas well sites, as well as sewage and waste from cleaning streets, sewers, septic tanks and grease bins. A type of tractor trailer unit used for such fluids is a dump truck, also known as an end dump unit, that allows a sludge/slurry to be quickly and easily unloaded, as one end of the container lifts up and a gate opens on the opposite end to allow the sludge/slurry to flow out of the container through the gate. Such a unit may incorporate an open top container with a hinged roof.

Figure 12:
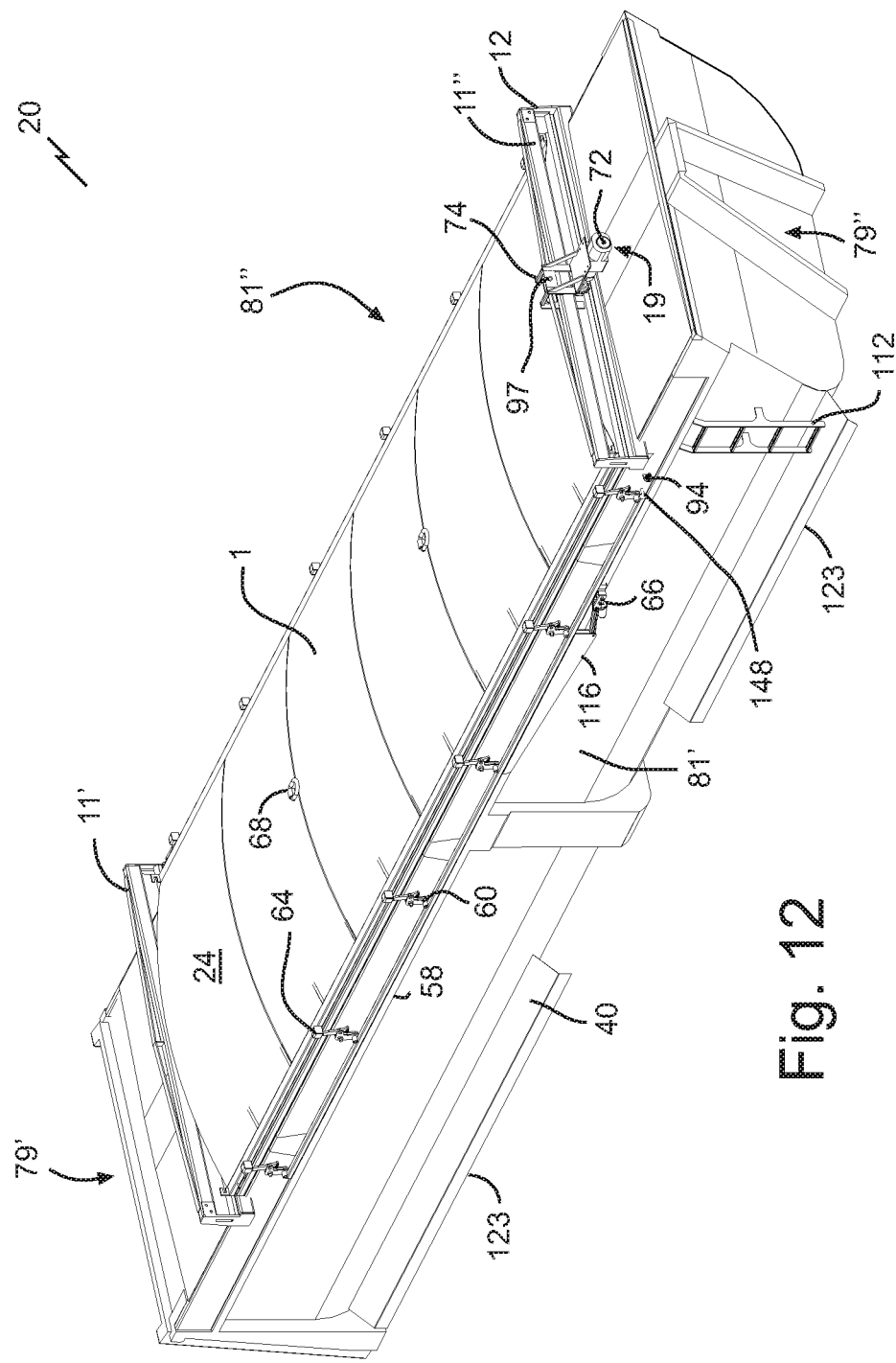
FIG. 12 is a perspective view of the open top container of FIGS. 8A and 8B with the roof in the closed position.
Figure 13:
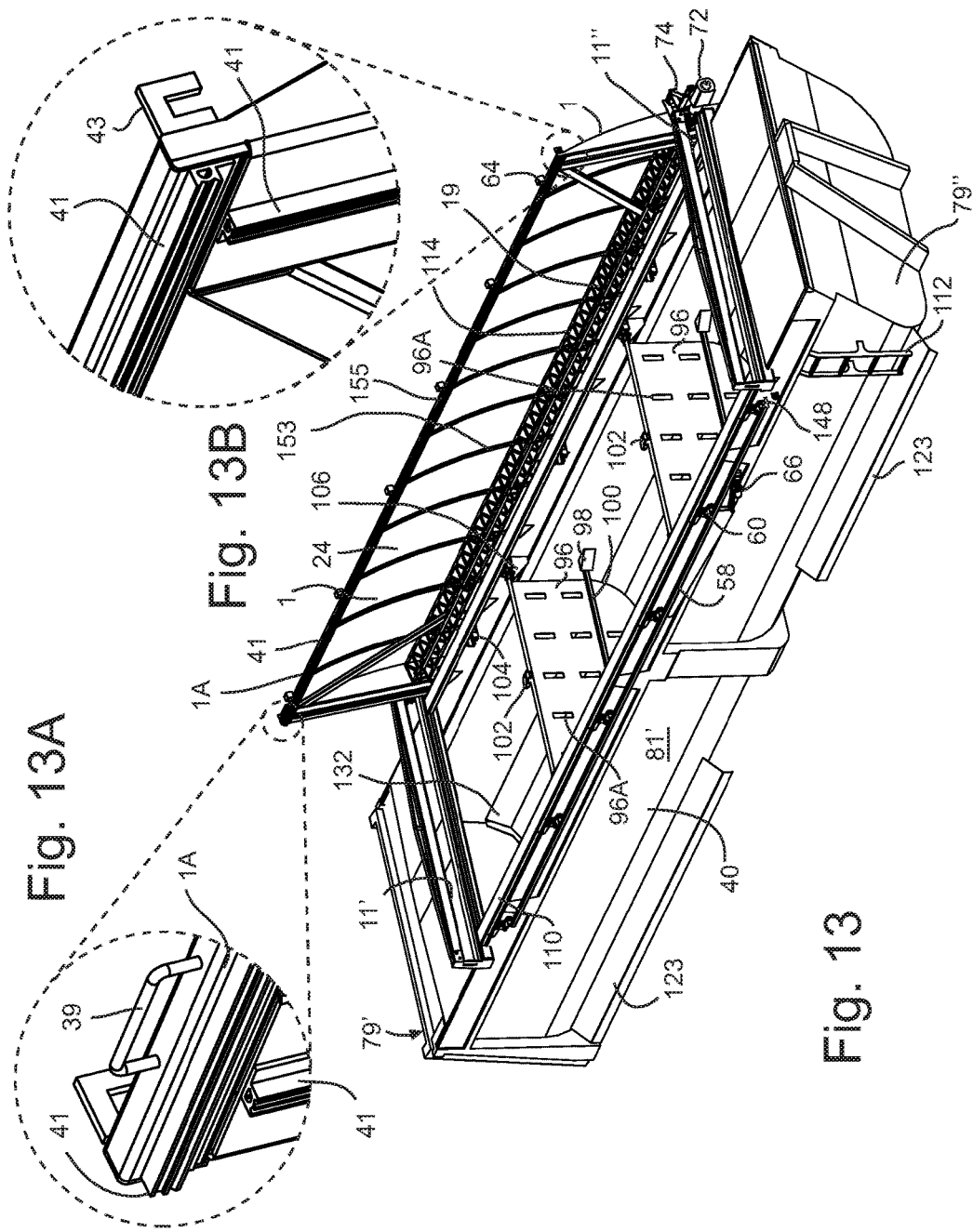
FIG. 13 is a perspective view of the open top container of FIGS. 8A and 8B in the open position, displaying a system of interior baffles.

Referring to FIGS. 12 and 13, an apparatus 20 is illustrated having an open top container 40. In some cases a track 11 and a rolling roof 1 may be present. The track 11 may be mounted to the open top container 40 between opposed side walls 81 (shown by 81' and 81") of the container 40. Side walls 81 may collectively form a perimeter wall along with axial end walls 79 (shown by 79' and 79"), although in some cases all walls 81 and 79 may be considered to be side walls. The roof, such as rolling roof 1, may be mounted by an axle 19 to the track 11 to permit the roof 1 to slide along the track 11. The roof 1 may be mounted to slide along the track 11 from a closed position to one or either side of the open top container 40 and then to be rotated about axle 19 into an open position.

Referring to FIGS. 12 and 13, roof 1 may be configured to slide to one side of the track 11, or either sides of track 11. For example, roof 1 may be mounted to the track 11 to permit the roof 1 to slide along the track 11 from a closed position to a first of the opposed side walls 81" of the open top container 40 and then be rotated about the axle 19 into a first open position. Roof 1 may also slide along the track 11 from a closed position to a second of the opposed side walls 81' of the container 40 and then be rotated about the axle 19 into a second open position. In the case where the roof 1 is permitted to slide to either side wall 81' or 81", the user retains the flexibility to choose the most convenient way to open the roof 1. For example, if an excavator or loader has access to only the left (passenger) side wall 81' of the container 40, then the user will likely roll the roof 1 to the right (driver) side wall 81" of the container 40, so that the open roof 1 does not obstruct access to the interior of the container 40 when opened.

Figure 9:
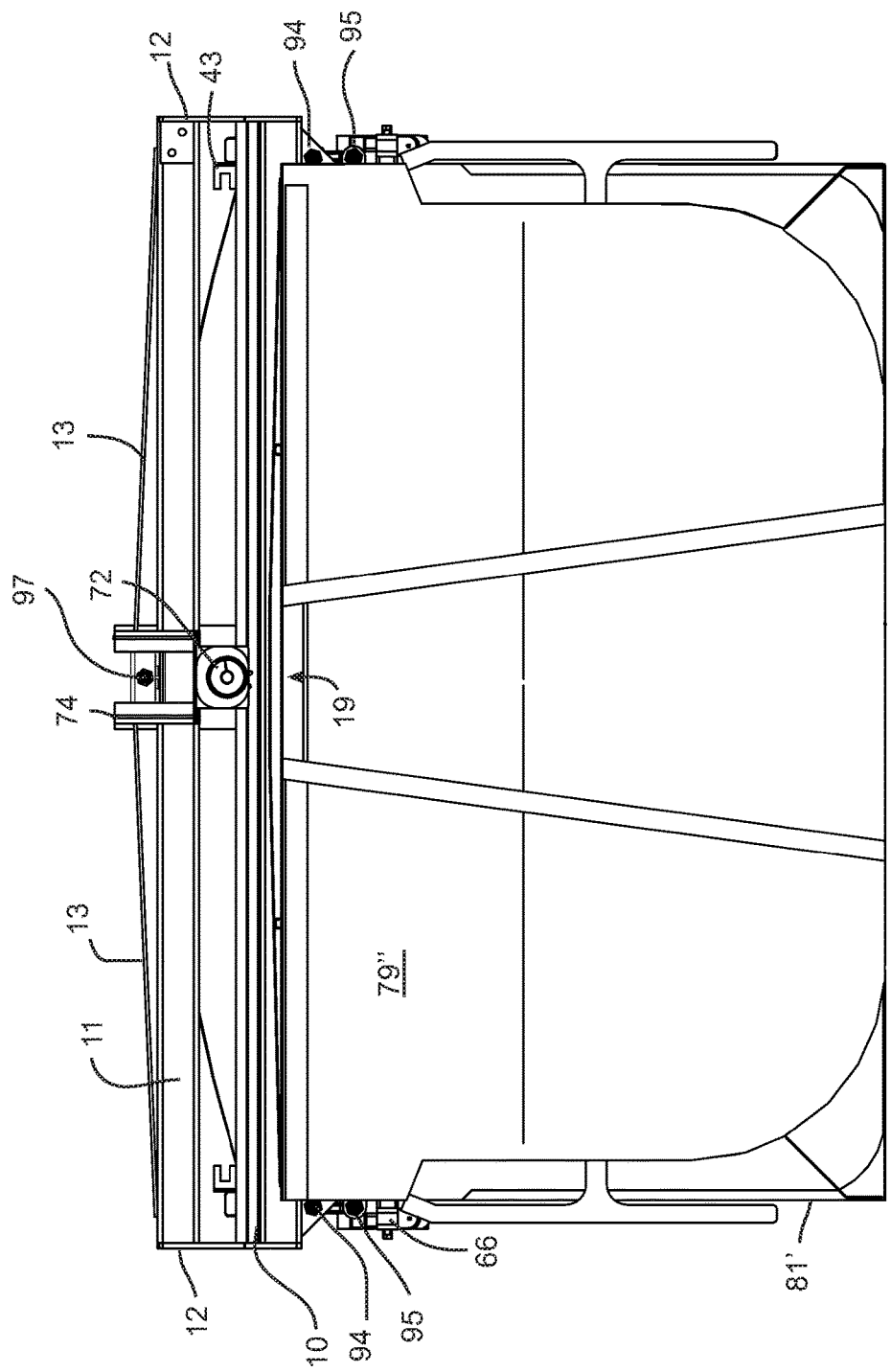
FIG. 9 is an end elevation view of the open top container of FIGS. 8A and 8B showing the rolling roof in the closed position.
Figure 10:
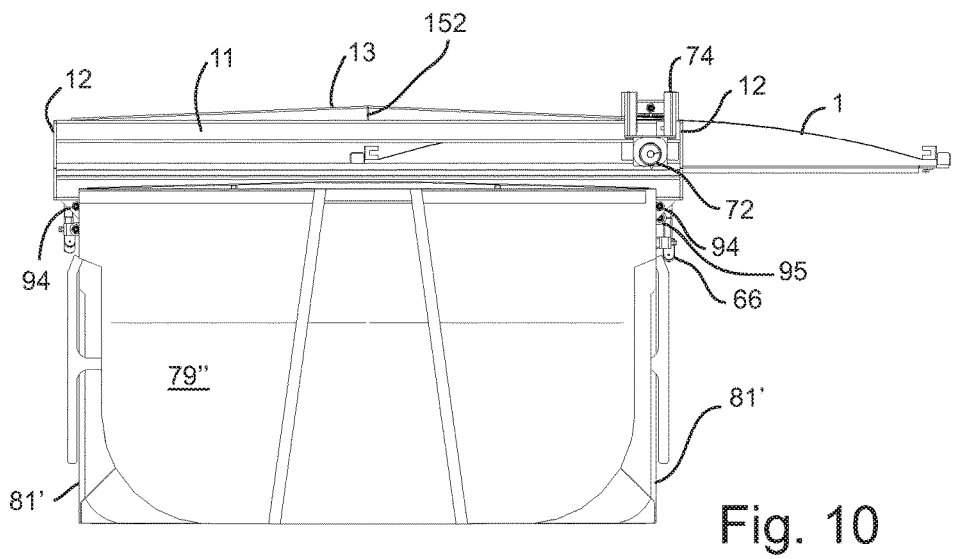
FIG. 10 is an end elevation view of the open top container of FIGS. 8A and 8B showing the rolling roof in a horizontal position dangling at one longitudinal end of the track.
Figure 11:
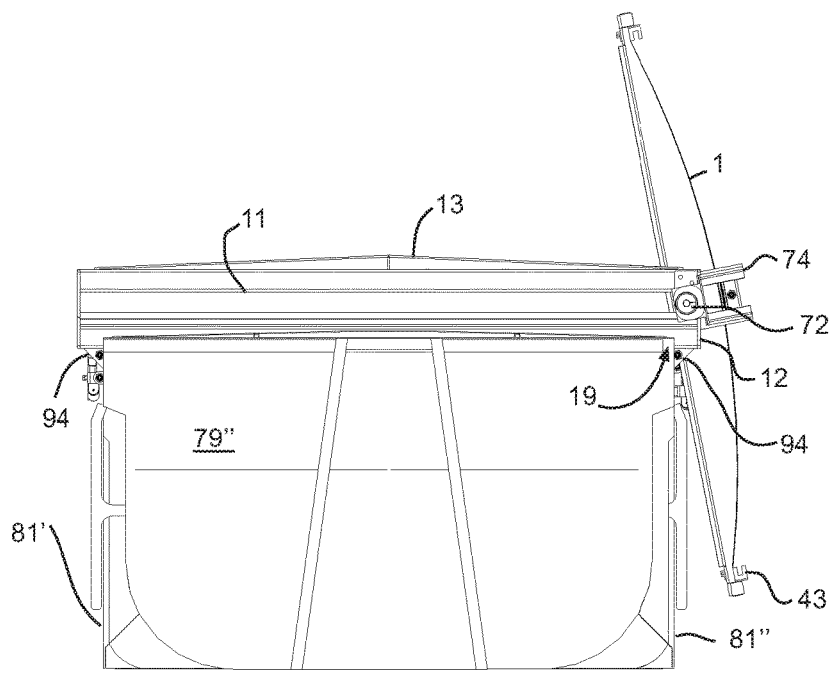
FIG. 11 is an end elevation view of the open top container of FIGS. 8A and 8B showing the rolling roof in the open position.

Referring to FIGS. 9-11, from the open position the roof 1 may be returned to the closed position. For example, roof 1 may be rotated from the open position (FIG. 11) into a horizontal dangling position (FIG. 10). The roof 1 may then be slid into the closed position (FIG. 9). Thus, the closing procedure may be the reverse of the steps of the opening procedure. Referring to FIG. 9, while in the closed position, the roof 1 may be oriented in a horizontal or near horizontal position. Referring to FIG. 10, the roof 1 may be oriented horizontal or near horizontal when in a dangling position at either longitudinal end of the track 11. Referring to FIG. 11, the roof 1 may achieve a vertical or near vertical orientation, for example at an angle of 80 or 85 degrees from horizontal, when in the open position. By permitting the rolling roof 1 to open to a near vertical or vertical position, the roof 1 permits the opening of a full loading area of the container 40 from the side wall 81' opposite to the side wall 81" that the roof 1 lies against when in the open position.

Referring to FIGS. 9-11 and 15, axle 19 may be positioned within roof 1 at a position that balances the mass of the roof 1 on either side of the axle 19. For example, axle 19 may be located along, or otherwise defines, a central axis of the roof 1, for example along a vertical plane (not shown) that cuts the roof 1 along a plane of visual and/or mass symmetry between sides or side walls 81. Balancing the mass of roof 1 on either side of the axle 19 may allow for roof 1 to be smoothly tilted between horizontal and vertical positions at the end of the track 11. In some embodiments, axle 19 may be positioned at a suitable location between the side edges of the roof 1 without cross the central axis.

Referring to FIGS. 12 and 13, track 11 may comprise a pair of parallel tracks 11' and 11". Parallel tracks 11' and 11" may be mounted adjacent respective opposed axial end walls 79" and 79', respectively, of the open top container 40. Parallel opposing tracks 11 may permit a single axle 19 or respective axles (not shown) to be mounted to roll along both of the pair of tracks 11' and 11". The use of parallel tracks 11 on either axial end of the roof 1 prevents the roof 1 from binding due to non-uniform lateral motion at the axial ends of the roof. In some cases the axle 19 is rotationally locked between the tracks 11 so that motion on one axial end of the roof 1 is equally transmitted to the other axial end, and vice versa. The use of parallel tracks 11 effectively provides a frame that defines a lateral axis along which the roof 1 may slide from side to side over the top of the container 40.

Figure 14:
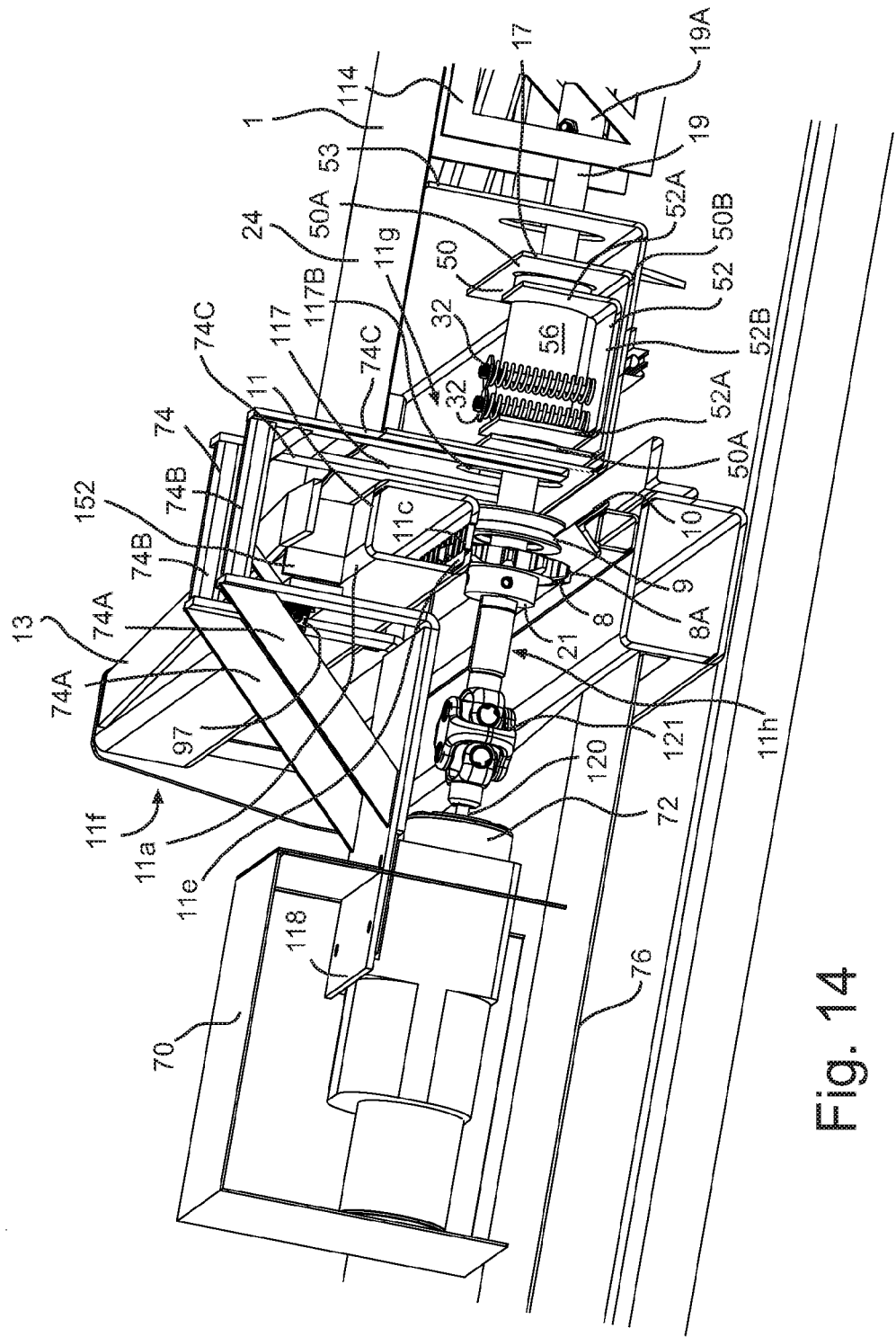
FIG. 14 is a section perspective view taken along a vertical plane to the right of the electric motor and through the bearing holder of the open top container in FIGS. 8A and 8B.

Referring to FIG. 14, axle 19 may engage track 11 via a suitable mechanism, such as a rack-and-pinion mechanism. For example, track 11 forms a rack, while axle 19 comprises or connects to a pinion that rolls along the rack 11. The pinion may comprise a sprocket 8 as shown for meshing with the rack. In some cases the pinion may take a suitable form such as a roller, while the track 11 may take a suitable form such as a rail. Plural pinions and tracks may be used.

Figure 15:
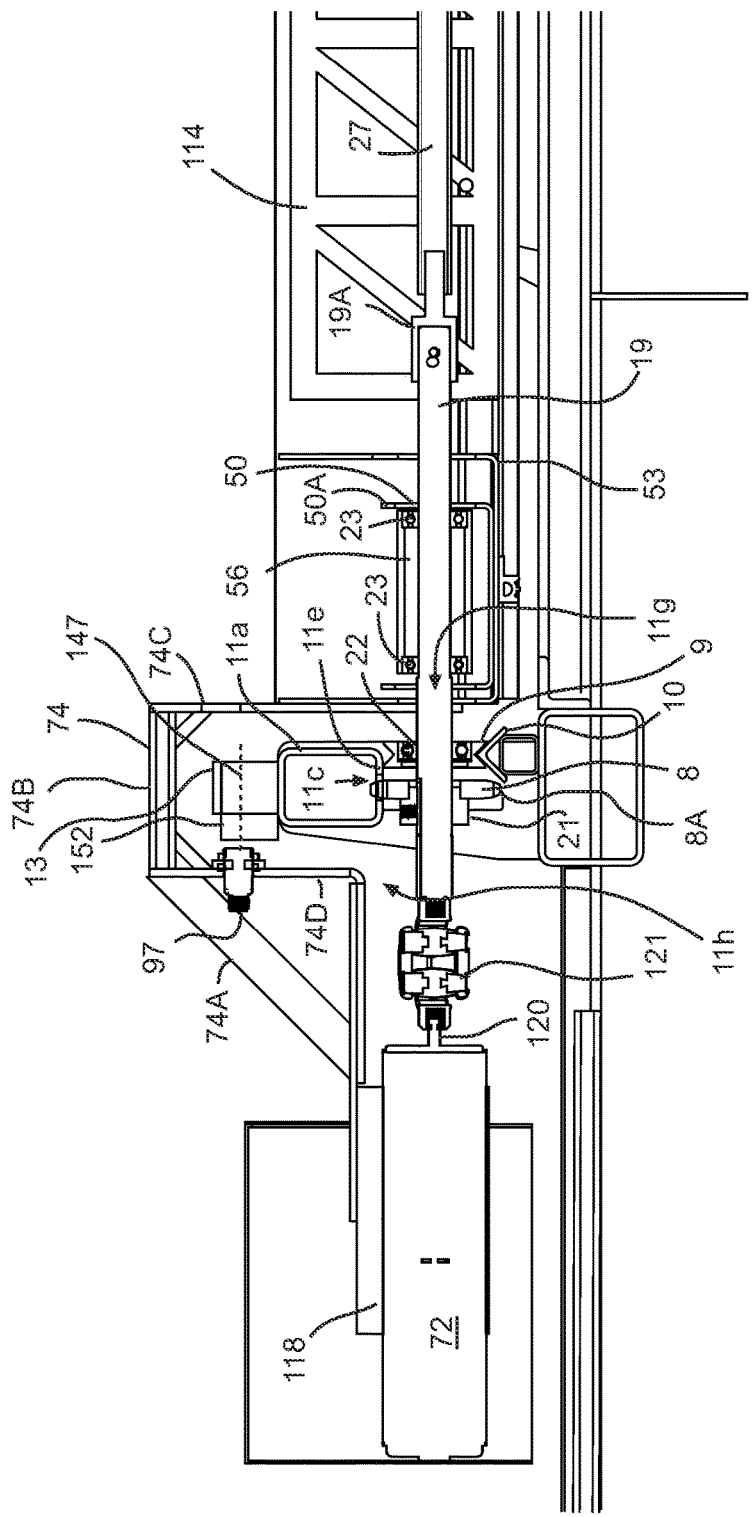
FIG. 15 is a section view taken along a central vertical plane through the electric motor and bearing holder of the open top container in FIGS. 8A and 8B.

Referring to FIGS. 14 and 15, the rack of track 11 may comprise a plate 11e with a series of holes, such as sprocket holes 11c, that are spaced along a longitudinal length of the plate 11e to form the rack 11. The teeth 8a of the sprocket wheel 8 may enter and engage with the holes 11c of the track 11 to permit the axle 19 to roll along the track 11 to either side wall 81 of the container 40 in use. In some embodiments, plate 11e is formed by a tube 11a, such as a suitable beam for example a box beam as shown, or a C-beam, I-beam, L-beam, or others. Other suitable forms of a rack may be provided, such as a chain secured to plate 11e.

Referring to FIGS. 14 and 15, track 11 may be formed by a pair of adjacent opposed tracks, such as top track or rack 11 and a bottom track (roller track 10) to retain the axle 19 within contact with the track during operation. Top and bottom racks may be used (not shown). Both tracks may contact sprocket 8, or as shown one may contact sprocket 8 and another contacts a second part such as a bushing surface or in this case roller 9. Tracks 11 and 10 may be opposed and rigidly connected at a fixed distance relative to one another, for example at all positions between axial ends 11f of the rack or track 11 to retain the axle 19/sprocket 8 in contact at all times with the rack 11. In other cases the track 11 may include breaks or parts that move into or out of contact with the sprocket 8 during use.

Referring to FIGS. 14 and 15, roller track 10 of track assembly 11 may be provided to engage a roller 9. Roller track 10 may comprise an L angle iron connected, for example welded, to the frame of the container 40 that is utilized as a bottom track for a V roller 9. A V roller 9 may be located coaxial with sprocket 8 and may sit upon roller track 10 to align the sprocket 8 with the track 11. Referring to FIG. 9, the track assembly 11 may comprise a pair of end plates 12 and a pair of brace plates 13 between the end plates 12 to form a solid frame structure that prevents misalignment between L angle iron roller track 10 and track 11 during use. The plates 12 may sit beyond side walls 81 to permit the axle to pass a vertical plane defined by the side wall 81, and then to rotate into a vertical or near-vertical position. Referring to FIGS. 9-11, after force is applied to rotate the axle 19, the V roller 9 may rotate along the L angle iron roller track 10, until it reaches plate 12 at the axial end point of track assembly 11 (FIGS. 9-10). At such point, half of the rolling roof 1 is dangling free in a horizontal position and is enabled to tilt into a vertical position (FIG. 11) with minimal physical strength (because the axle crosses a center of gravity of the roof), where V rollers 9 are utilized as fulcrum for the entire system.

Referring to FIGS. 12 and 13, an actuator may be connected to slide the roof 1 along the track 11. A suitable actuator may be connected to shaft or axle 19 to rotate or roll sprocket 8 and slide the roof 1 along the track 11. Referring to FIGS. 4 and 14, two examples of a suitable actuator include a ratcheting handle 4 (FIG. 4) and a motor 72 (FIG. 14), such as a hydraulic or electric motor.

In some cases the actuator is connected to rotate the roof 1 into the open position. Referring to FIGS. 10-11, motor 72 provides one example of such an actuator. Once the roof is in the dangling horizontal position, actuator or motor 72 may also rotate the roof 1 into the open position. In the example shown the motor 72 drives a pinion that engages a top rack or track 11, with the pinion mounted below the rack or track 11. Referring to FIGS. 9-11, in such a case, rotation of the motor 72 in one direction will slide the roof 1 to one side of the container 40 (FIG. 9), and upon reaching one side of the container 40 (FIG. 10), the pinion or sprocket 8 becomes rotationally locked with the track 11, for example by contacting the end of the track 11, switching operation such that now the motor 72 turns itself about the axle 19, rotating the entire roof 1 toward the adjacent side wall 81". The use of a top track 11 that faces downward as shown permits the motor 72 to achieve the aforementioned sliding and roof rotation functions without changing direction or stopping.

Referring to FIGS. 14 and 15, motor 72 may be mounted to the rolling roof 1 in a suitable fashion. Referring to FIGS. 14 and 15, motor 72 may be positioned on or adjacent a first longitudinal side of the track 11, such as side 11h. Motor 72 may be mounted to the roof 1 via a support arm, such as provided by plates 74A-C and 118 of a motor mount frame 74, that extends over, for example crosses above, the track 11 and anchors to the roof 1 on a second longitudinal side 11g of the track 11. The frame 74 may extend from the rolling roof 1 and over the track assembly 11 to rigidly connect the roof 1 and motor 72 to ensure that the roof 1 and motor 72 move together during opening and closing operation.

The frame 74 may have a suitable structure, and may form a cantilever for example as shown. Frame 74 may comprise structural plates 74C that are secured to an end plate 117 of rolling roof 1 and that extend to connect with structural part 74B. Structural part 74B may comprise a beam or plate and extends over the track assembly 11 to meet additional structural plates 74D. Structural plates 74C, 74D may be braced with additional support members such as diagonal plates 74A. Plates 74A and 74D may support a motor mount plate 118 that secures electric motor 72. Motor 72 may be covered entirely or in part by a suitable housing such as motor cover 70. Motor cover 70 may shelter sensitive components of the motor 72 from damaging elements such as physical debris or weather.

Referring to FIGS. 10-11, apparatus 20 may comprise one or more sensors, such as roof position sensors 94, 97, or lock/latch position sensors 95. Each sensor may comprise a plurality of sensors or a plurality of sets of sensors. The sensors disclosed in the drawings are proximity sensors such as photoelectric sensors, although other types of sensors may be used such as infrared, inductive, capacitive, ultrasonic, limit switch, or other sensors. Photoelectric proximity sensors may detect the presence of metal, and may be sensitivity adjustable, for example by adjusting a threaded component (not shown), for example to a sensitivity of 0.1 inches. A suitable sensor includes the GRTE18S-P2312 made by SICK™ Each sensor may be used to detect one or more predetermined conditions, and in response, the sensor itself, or a controller, may respond by triggering a respective event. The type of event initiated may depend on the condition. In general with the sensors disclosed here, a controller may be used to interpret and respond to sensor control signals, or the sensor may be set up to apply feedback in an appropriate fashion such as by closing or opening a connection in an electrical circuit. Any given sensor may be set up to operate such that a first event happens when one condition is met, and a second event happens when a second condition is met. The event may depend on other conditions being met, for example determined by signals from other sensors. Each sensor may track a portion or entirety of a complete range of operational movement of the part being tracked.

Referring to FIGS. 10-11, 14, and 18A, a roof position sensor may comprise plural roof position sensors. For example, referring to FIGS. 10-11 and 18A, a first roof position sensor 94 may be mounted to the roof or open top container 40 (the latter is shown) for detecting the open position. In the example given the sensors 94 may trigger a signal to a controller (not pictured) when rolling roof 1 crosses a line of sight 146 within a specific range, such as <5 mm, indicative of the roof 1 having moved from out of to into the open position. In some embodiments, sensor 94 may trigger an event such as an alarm once the aforementioned predetermined condition is met.

Figure 18A:
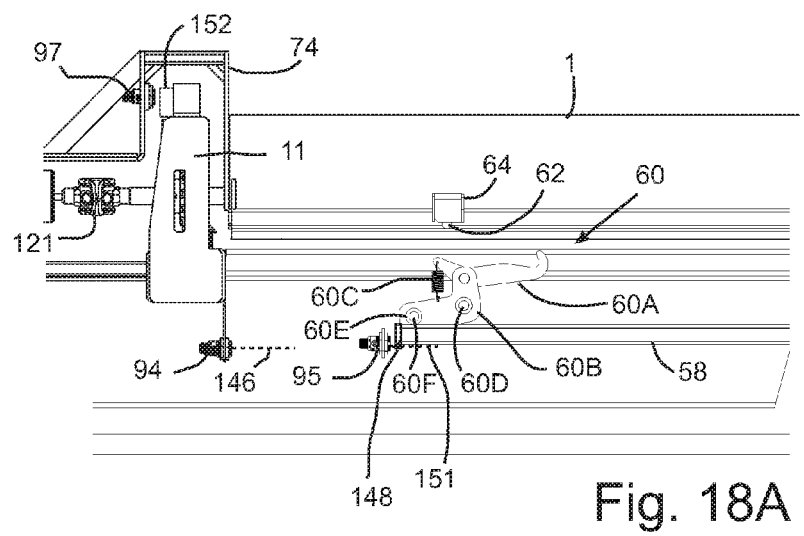
FIG. 18A is a side elevation view of a side latch of the open top container of FIGS. 8A and 8B in the fully disengaged position and in close proximity to a photoelectric latch position sensor.

Referring to FIGS. 9-11 and 18A, in the example shown a pair of sensors 94 are provided, one on each side wall 81' and 81", respectively. In the case of sensors 94, a condition may be met upon roof 1 rotating from the dangling position (FIG. 10) to the open position (FIG. 11), thus, crossing the line of sight 146 (FIG. 18A shows the line of sight 146 but with the roof in the closed position). Upon the sensor 94 detecting the proximity or position of the roof 1, an action or event may be triggered, for example, the roof position sensor 94 may be connected to reduce or shut off drive output from the motor 72 to prevent or restrict over rotation of the roof 1. The sensor 94 and associated control logic may be set up to avoid the roof 1 contacting the side wall 81". In some cases, power may be restored by overriding the reduction or shut off, or by reversing the direction of the motor 72 to move the roof 1 back into the dangling position. The motor 72 may lock the roof 1 in position on shut off to prevent wind or external forces acting on the roof 1 to bump the roof 1 up against the side wall 81".

Referring to FIGS. 9, 10, and 14-15, a roof position sensor may comprise a second roof position sensor 97 mounted to the roof or open top container (the former is shown) for detecting the closed position. Track 11 may comprise a detectable part such as a plate 152 that protrudes from a plane defined by brace plates 13. Sensor 97 may be mounted to motor mount frame 74, for example between arm plates 74A. When the roof 1 centers itself in the closed position, the plate 152 crosses the line of sight 147 (FIG. 15) of sensor 97 and the predetermined condition is met. The roof position sensor 97 may be connected to reduce or shut off drive output from the motor 72 when the roof has moved into the closed position, thus indicating to the user that condition has occurred. Power to the motor 72 may be restored by overriding (using a bypass control) the reduction or shutoff, or by stopping and restarting the motor 72, or by waiting a predetermined interval of time. In some cases a warning may be issued upon achieving the condition, for example a light may go on to confirm that the closed position is reached. Other events may occur in the closed position, for example power to the locking system discussed below may be established.

Figure 18B:
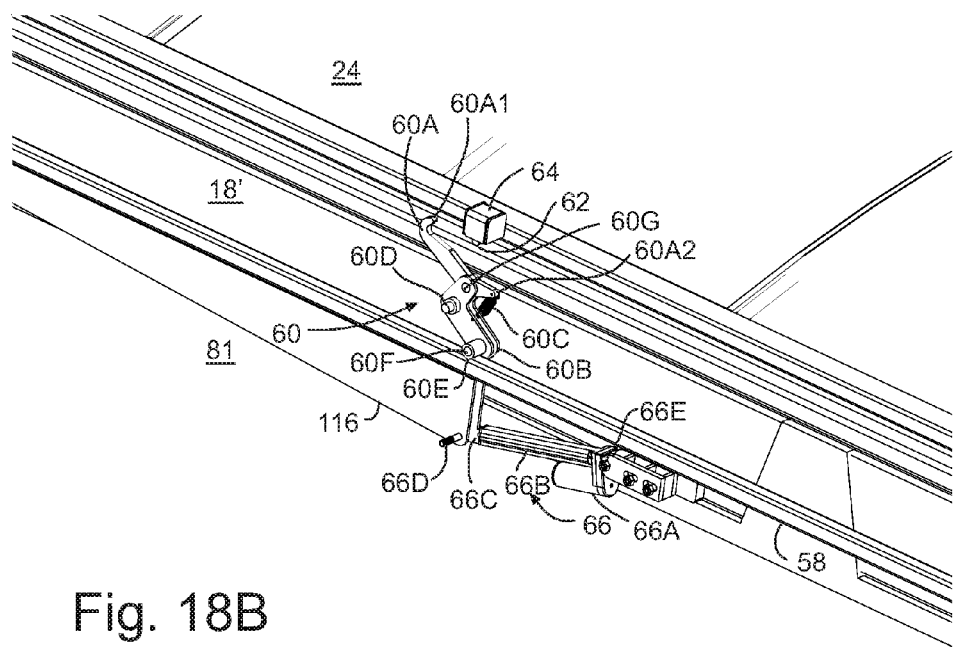
FIG. 18B is a perspective view of the open top container of FIGS. 8A and 8B, displaying a side latch and actuator in a partially disengaged or partially unlatched position.
Figure 18C:
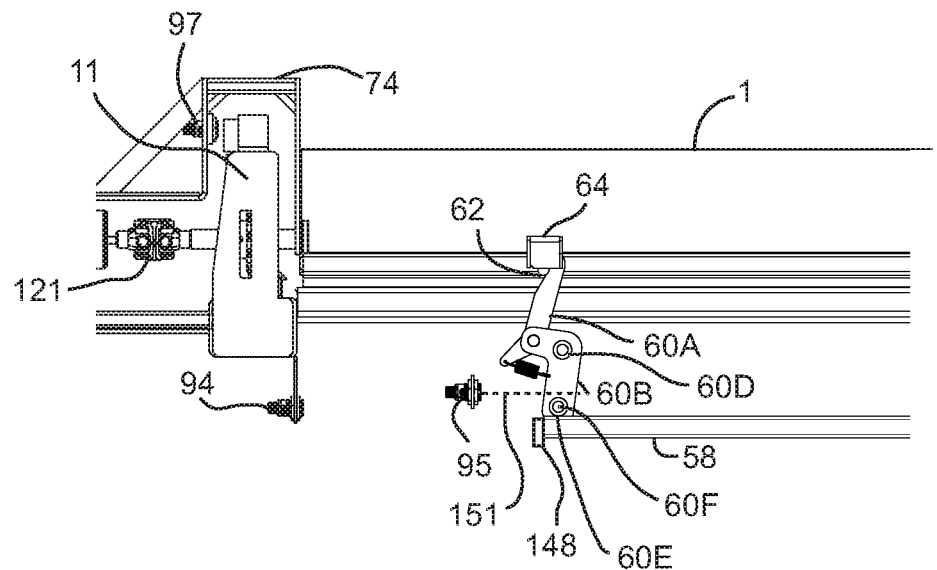
FIG. 18C is a side elevation view of a side latch of the open top container of FIGS. 8A and 8B in the latched position.

Referring to FIGS. 12-13, 16A-B, 17A-B, and 18A-D, apparatus 20 may comprise a lock for securing the roof in the closed position. The lock may comprise a suitable lock such as a latch 60, for example a set of latches along, either on or adjacent, one or more edges, such as edges along end walls 79 or side walls 81 of the open top container 40 or roof 1. In the example shown, the lock comprises respective sets of one or more (in this case six) latches 60 spaced along both of the opposed side walls 81', 81" of the container 40. Each set of latches may have a common latch actuator, such as a linear actuator 66, for example which operates all latches 60 in a set at once using a drive bar 58. Referring to FIGS. 18A-C, each set of latches 60 may comprise a plurality of pins 62 and a plurality of hooks 60A. Each hook 60A may engage and disengage a corresponding pin 62, one of which is located on the container 40 (in this case hooks 60A), and the other of which is located on the roof 1 (in this case pins 62A). Referring to FIGS. 16A-B, the hooks 60A may be pivotally mounted to the linear actuator 66 for engaging the plurality of pins 62 in a latched position. The latches 60 may collectively operate to apply tension between the roof 1 and container 40 at sufficient locations around the perimeter edge of the roof 1 such that the roof 1 may be held in the closed position, and in further cases such that the roof 1 may be squeezed against the container 40 to seal the container 40, for example by compressing seals 41 (FIG. 13A).

Referring to FIGS. 18A-C each latch 60 may have a suitable structure. Each side latch 60 may have a first hook part, such as a hinge or arm, or pair of arms 60B as shown, and a second hook part such as hook 60A. Each arm 60B may be pivotally mounted to the common latch actuator, for example drive bar 58, for example via a ring or hub 60E that is connected, for example rigidly connected such as by welding, to bar 58, and that pivotally mounts arm 60B via a pin 60F. In the example shown, as the bar 58 moves, the hub 60E moves with the bar 58 causing arm 60B to pivot about pin 60F.

Referring to FIGS. 18A-C, the hook part 60A and hinge arm 60B may connect to one another and the container 40 in a suitable fashion and may have a suitable structure. Hinge arms 60B may be secured to side wall 81 by a pivotal connection through pin 60D. Hinge arms 60B may be connected to latch hook 60A via pin 60G. Referring to FIG. 18B, latch hook 60A may define a hook end 60A1 and a lever end 60A2. The lever end 60A2 may be secured to arms 60B via a biasing device such as spring 60C. Referring to FIGS. 18A-C, spring 60C permits the hook 60A to rotate with the arm 60B until resistance is encountered in the form of the pin 62, after which further rotation of arms 60B creates tension between hook 60A, arm 60B, and pin 62 that acts to pull the pin 62 and roof 1 in a downward direction with sufficient force to lock the roof 1. In cases where a compressible seal 41 lines the perimeter edge of the roof 1 or open top container 40 or both, the tension from the latches 60 acts to draw the roof tightly against the container 40 to compress the seal 41 and seal the interior of the container 40, which may be advantageous for hauling liquid or solid liquid mixtures. Pin 62 may have a protective housing or retainer frame, such as pin cover 64, which retains the hook part 60A on the pin 62 when latched.

Referring to FIGS. 12-13, 16A-B, 17A-B, and 18A-D the latches 60, support or drive bar 58, and actuator 66 may cooperate together to operate in a suitable fashion. Each side latch support or drive bar 58 may be provided for operating and supporting a respective set of side latches 60. In some embodiments, side latch 60 is a plurality of side latches spaced along bar 58 for example to provide uniform pressure around roof 1. Referring to FIGS. 16A-B, 17A-B and 18B, the linear actuator 66 may be connected to drive the support bar 58 via a suitable mechanism such as a base bar 116 pivotally connected to an extension and retraction member such as screw shaft 66C. Referring to FIG. 18B the actuator 66 may be pivotally mounted to the side wall 81' via hinge pin 66E, and upon extension and retraction of shaft 66C may cause the bars 116 and 58 to translate and latch/unlatch the latches 60. Linear actuator 66 may drive the support bar 58 and affect the opening and closing of each latch 60. Referring to FIGS. 16A-B, 17A-B, and 18B, linear actuator 66 may drive support bar toward front end wall 79" of container 40 and in an upward direction to move the latch into the unlatched position (FIGS. 17A-B) or toward end wall 79' and in a downward direction 144 to close the latch into the latched position (FIGS. 16A-B). Once latched (FIGS. 16A-B), further extension by the actuator 66 may increase tension in the spring 60C to apply a force on the roof 1 in a downward direction 144 to seal the roof 1 against the container 40.

Referring to FIG. 18B, actuator 66 may be a suitable actuator with suitable components. For example, linear actuator 66 comprises an electric motor 66A, although other drive mechanisms may be used such as hydraulic, pneumatic, magnetic, crank, manual, automatic, rack and pinion, chain and sprocket, or other mechanisms, as is the case for all actuators in this document. Each latch 60 may have its own actuator, or latches 60 may be grouped in groups that have a common actuator. Electric motor 66A may be connected to drive screw shaft 66C into and out of a cylindrical housing 66B. Screw shaft 66C may be driven via a threaded mechanism, such as a worm gear transmission, in housing 66B to drive base bar 116. The shaft 66C may be pivotally connected to bar 116 via a pin 66D. By driving the screw shaft 66C in a clockwise or counter-clockwise fashion, the motor 66A may push or pull bar 116 and therefore extend and lower or retract and raise support bar 58.

Referring to FIGS. 16A-B and 17A-B, the latches 60 may be oriented and structured to cooperate with the operation of the rolling roof 1. Referring to FIGS. 17A-B, in an unlatched position the plurality of hooks 60A may be positioned below a plane defined by a top perimeter rim 154 of the container 40. Spring 60C may assist in ensuring that hook 60A returns to a position below the plane when unlatched as shown. Referring to FIGS. 16A-B, when in a latched position the plurality of hooks 60A may engage respective pins 62 and may extend above the plane defined by rim 154. In some cases the latches 60 achieve about or equal to ninety degrees or more of rotation between the latched and unlatched position, defined about pin 60D.

Figure 18D:
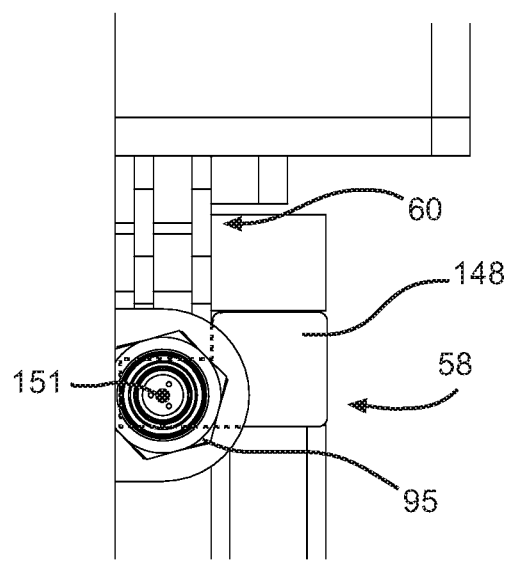
FIG. 18D is an end elevation view of the photoelectric sensor in FIG. 18A illustrating that the actuator bar supporting the latch is in line and close proximity with the photoelectric latch position sensor.

Referring to FIGS. 12-13, 16A-B, 17A-B, and 18A-D, a lock position sensor or sensors 95 may be present, for example to track the position of the latches 60. Sensor 95 may comprise a plurality of sensors 95 located on the side walls 81', 81" of the apparatus 20, for example one or more sensors 95 on each respective side wall 81. In the example shown, the proximity sensor 95 is positioned to track the movement of the bar 58, for example to detect the position of the bar 58 in the fully unlatched position. Referring to FIG. 18A, in some embodiments, support bar 58 may comprise a part, such as an end cap 148, that extends across a line of sight 151 of the sensor 95. Referring to FIGS. 18A and 18D, end cap 148 may cross the line of sight 151 of sensor 95 in close proximity with sensor 95 when entering the fully unlatched position where the latches 60 are fully below the plane of the underside of the roof 1. Referring to FIG. 18C, end cap 148 by contrast may be out of the line of sight 151 of sensor 95, or may be out of sensing range from sensor 95, when in the latched position. Referring to FIG. 18D, end cap 148 may have a suitable shape such as an L-shape to reach into the line of sight 151 when in range. Sensor 95 may send a signal to a controller (not pictured) to indicate that the side latches are in the unlatched position. The lock position sensor or sensors 95 may be connected to reduce or prevent operation of the motor 72 when the respective sets of latches 60 are out of an unlatched position, or are in the latched position. Thus, the motor 72 may be prevented from running and potentially damaging the roof 1 when the latches 60 are obstructing the path of the roof 1.

Other sensors 95 may be used to track other parts of the latch cycle, for example to track and confirm that the sensors 95 are locked. In one case of the latter, a force sensor may be present between hook 60A and arm 60B to detect a tension between the two indicative of the hook 60A engaging the pin 62.

Suitable power source may be provided, such as a battery, for example a 12 Volt battery mounted on the apparatus 20 or on an associated unit such as a trailer or a tractor unit. In some cases the battery is a battery that mounts to a trailer that carries the apparatus 20, for example for operating tail lights on the trailer. A suitable connection (not shown) such as a quick connector may be used to connect the battery to the circuit as needed. Passenger and driver side latch sensors 95', 95" communicate with control terminal 160 (for example a programmable logic controller or other controller), and power terminals, through relays. Both of the driver side and passenger side motor controls communicate with control terminal, and passenger and driver side sensors 94' and 94", through relays. Driver side latch controls (open), (close), and passenger side latch controls (open) and (close), communicate with control terminal, and power terminals and 165. Various fuses may be used as desired. Controls may be accessed on a suitable medium, such as a control board in a box (not shown), for example located in a housing or box, for example in a compartment defined on a front end of the container.

The operation of the roof 1 will now be described for a procedure that involves sliding the roof 1 to the driver side wall 81" of the apparatus 20, opening the roof 1, and closing. However, it should be understood that the same or analogous logic and circuitry may apply to the same procedure undertaken on the passenger side wall 81' of the apparatus. A user may arrive at a job site with the latches in the latched position and the roof 1 in the closed position. At the job site, the user may attempt to operate the motor 72 using the driver side motor control 196, but to no avail as the latches 60 are still engaged in the latched position. As long as one set of the latches 60 is engaged or out of a fully open position, the motor 72 cannot be activated, and in some cases an indicator such as an LED light 198 is on to alert the user to the latched condition.

Thus, the user then activates the driver and passenger side latch controls, specifically controls 186 and 190 to open the latches 60. Once fully open, sensors 95' and 95" send control signals to remove the block of motor 72 activation from the latches. However, because the roof 1 is in the closed position, sensor 97 is still detecting the presence of plate 152, and motor 72 cannot be activated. Thus, the user hits the bypass control 184 and the driver side roof control 196, causing the motor 72 to activate as there are no further restraints on motor 72 operation. The roof 1 slides to the driver side wall 81" of the apparatus and rotates into the open position. When in the open position, the sensor 94" detects the open position and cuts off power to the motor 72, preventing further rotation of the roof 1. The user may then manually or automatically secure the roof in the open position, and begins work filling the container 40.

When the work is complete, the user releases any lock on the roof 1 in the open position, activate the bypass control 184, and activate the motor 72 by activating the passenger side motor control 194 to cause the roof 1 to rotate back to horizontal, and slide toward center. As long as the roof 1 is open and sensor 94" detects the open position, the motor 72 cannot be activated without the bypass control 184, although this is not required and in some cases driving the motor 72 in the opposition position when in the open position is not prohibited. The bypass control 184 may not permit further advancement of the roof in the driver side direction or passenger side direction when the roof is open on the driver side or passenger side, respectively. Once the roof 1 enters the closed position, sensor 97 activates the applicable circuit components and motor 72 is deactivated.

Referring to FIG. 28, from closed the user may then lock or latch the roof 1 to secure the roof 1 in the closed position. To latch the unit the user initiates passenger and driver side latch controls 188 and 192 to close the latches 60. If the sensor 97 does not detect the closed position, the passenger and driver side latch actuators 66' and 66" are prevented from operating. However, if the sensor 97 detects the closed position the latch actuators 66' and 66" are permitted to operate. The latches 60 begin to close, and as soon as the latches 60 are out of the unlatched position the sensors 95' and 95" send control signals to obstruct further operation of the motor 72 until the latches 60 are fully open again. Since the roof 1 is now closed, the user is free to move the apparatus off site, for example to a disposal site.

Figure 2:
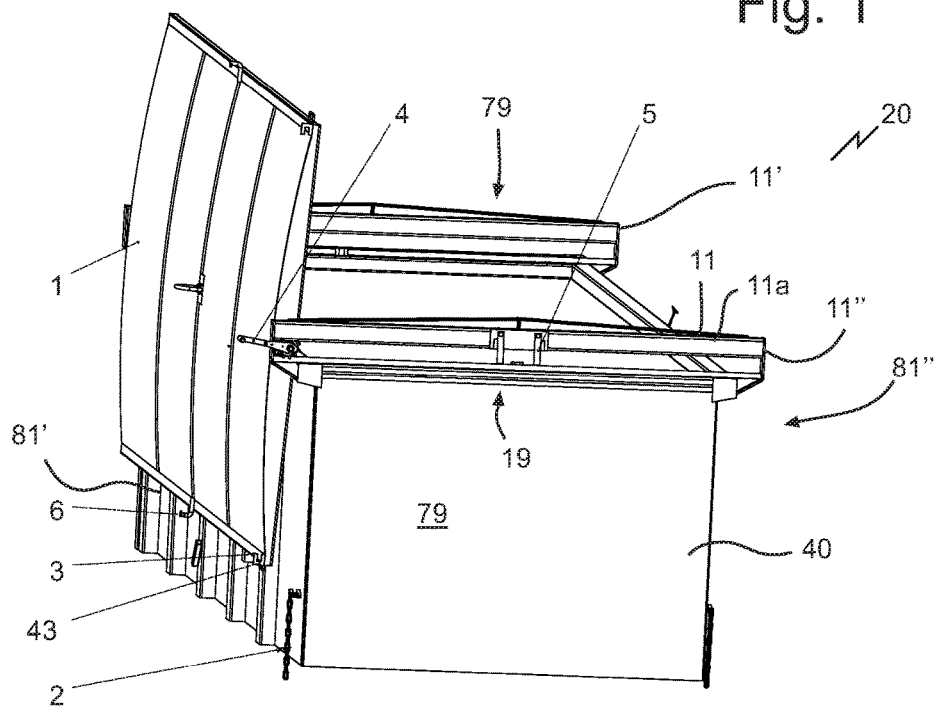
FIG. 2 is a perspective view of the open top container in FIG. 1 with the rolling roof in the open position.

Referring to FIGS. 14-15, 19 and 19A, axle 19 may be mounted to the roof by a compressible part and suitable associated structure. The compressible part may permit the roof 1 to move in a vertical direction relative to the axle 19, for example a direction that has a vertical component as well as a horizontal component, or a direction that is absolute vertical or vertical relative to the horizontal plane of the track 11. The axle 19 may be mounted by a bearing, such as bearings 23, to a first frame that is nested within or has nested within it a second frame that mounts to the roof. The compressible part or spring 32 may connect the first frame and the second frame. In the example the second frame is formed by an outer bracket 50 within which is nested the first frame formed by an inner bracket 52. Outer bracket 50 may comprise a pair of side plates 50A separated by a base plate 50B. Base plate 50B may be secured to rolling roof 1 via a bearing support frame or bracket 53 (FIG. 20B2). The first frame and the second frame may be pivotally connected to one another, for example inner bracket 52 may be connected to outer bracket 50 via an axle 54. Inner bracket 52 may comprise a pair of side plates 52A separated by a base plate 52B. In the example shown both frames are U-shaped, although other shapes may be used.

Figure 19:
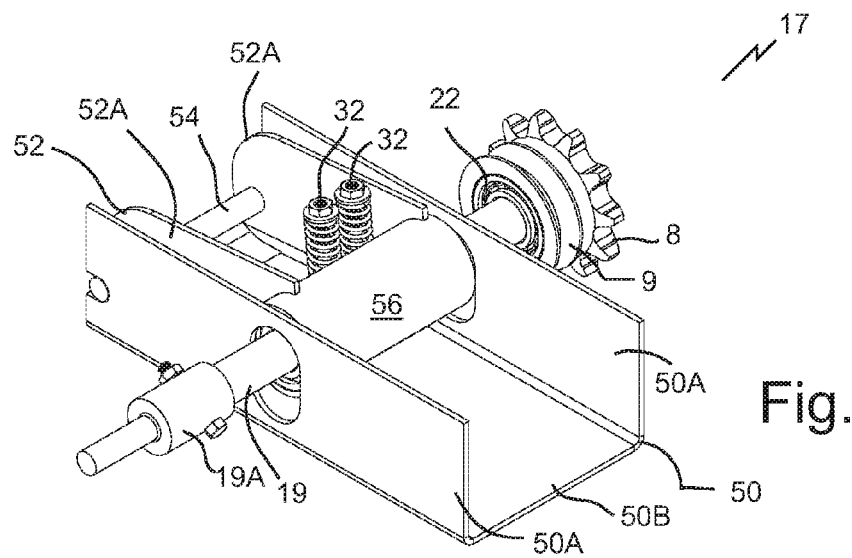
FIG. 19 is a perspective view of a compressible bearing holder and axle of the apparatus of FIGS. 8A-B.
Figure 19A:
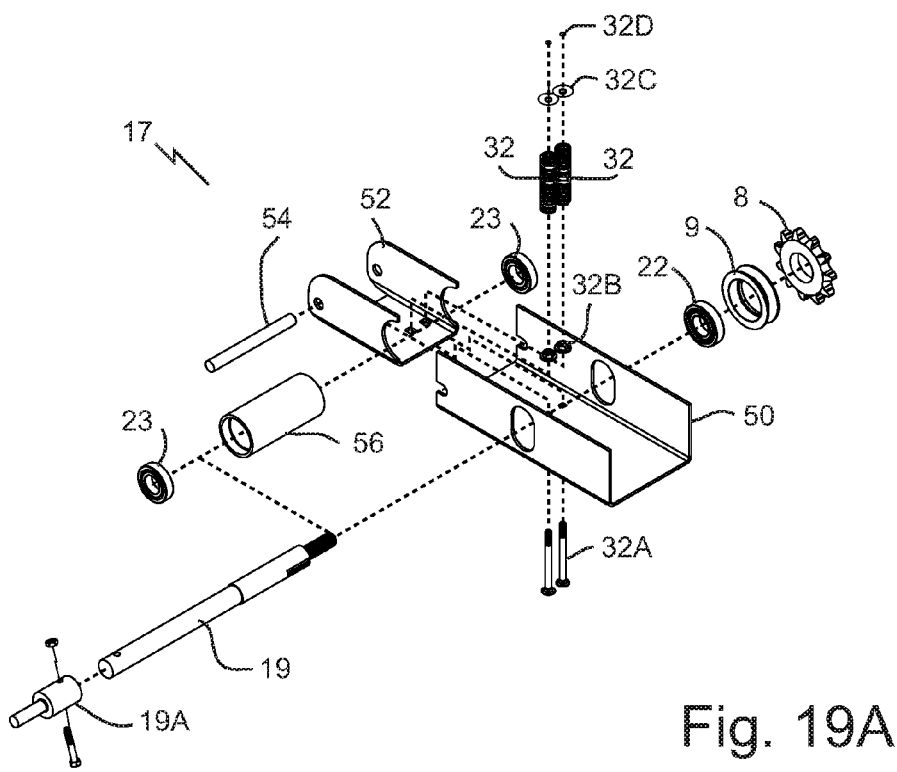
FIG. 19A is an exploded perspective view of the bearing holder of FIG. 19.
Figure 20:
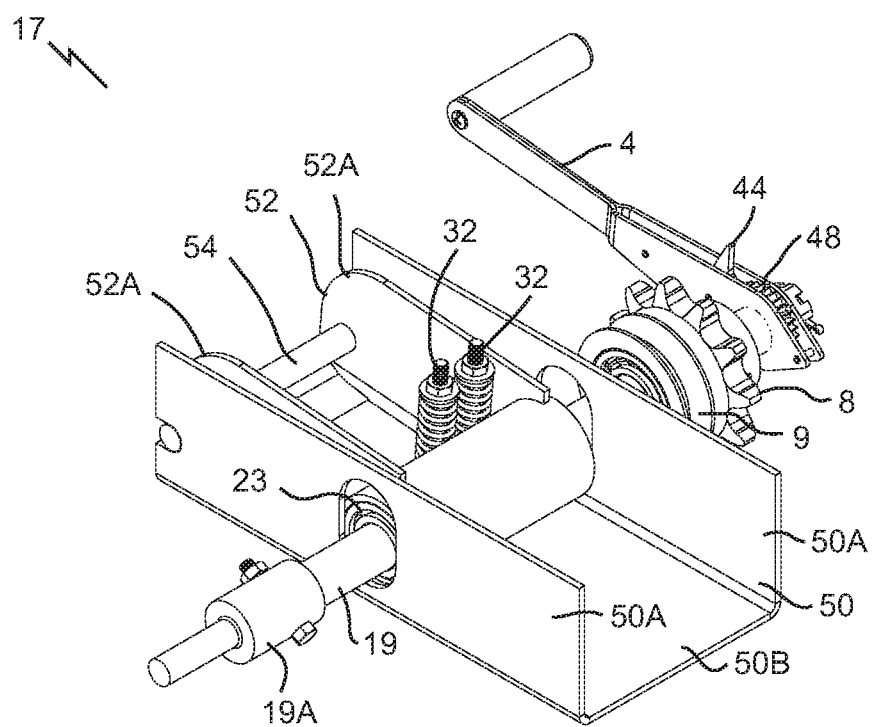
FIG. 20 is a perspective view of the bearing holder of FIG. 19 installed with a ratchet actuator, and with the springs in a compressed neutral state.

Referring to FIGS. 19 and 19A, the compressible part may comprise a spring, such as a pair of springs 32. Springs 32 may each be mounted on respective shafts, such as pins 32A, with respective nuts 32D for adjusting spring tension. Springs 32 may be secured to the outer and inner brackets 50, 52 via spring pins 32A. Pin 32A may pass through the outer bracket 50 and through inner bracket 52, compressing springs 32 between inner bracket 52 and a nut 32D. One or more other components such as washers 32B and 32C may be present on pins 32A. Axle 19 may pass through bearings 32 to permit rotation of axle 19 relative to brackets 50 and 52. Axle 19 may extend through one or more shaft slot 117B defined by plate 117 to enter the bearing holder. Bearings 32 may be mounted in a suitable frame such as within a bearing cylinder 56. Inner bracket 52 may mount bearing cylinder 56. The loading of spring 32 in the neutral state may be manually tuned by turning nuts 32D, compressing or relaxing the springs 32 (compare FIGS. 19 and 20 for example). Other configurations may be used, for example if pins 32A mount to bracket 52 but not 50 with the top end of the springs 32 mounting to the roof 1, for example to an underside of the roof 1.

Referring to FIGS. 19 and 19A, roof 1 and outer bracket 50 may move downward relative to axle 19 when the latches 60 or other tensioning members press the roof 1 to lock the roof 1 in place, compressing springs 32. When the latches 60 and tensioning members are released springs 32 relax and lift the outer bracket 50. The use of a compressible part permits the sprocket 8 to permanently engage the track 11 despite the axle 19 being able to translate up and down as the roof 1 is moved to seal and unseal the container 40. The compressible part also permits the axle 19 to assume a neutral floating position from which the axle 19 can move up or down without contacting and wear against the roof 1. The configuration shown limits erosion by rusting and wear between components as contact points are reduced between moving parts.

Referring to FIGS. 14 and 15, the actuator, such as motor 72, may be mounted to permit the actuator or part of the actuator to move in a vertical direction relative to the axle 19. For example, the motor 72 may comprise a drive shaft 120 that mounts to the axle 19 via a power transfer part that permits such motion. An example of such a part is a double universal joint 121, also known as a Cardan joint. More than two universal joints may be used, for example four in series for smoother operation. A double-universal joint 121 permits bending at four points in the shaft, permitting axle 19 and shaft 120 to move relative to one another while remaining in a parallel or near parallel orientation. In such a configuration, sprocket 8 is permitted to remain fixed to track 11.

Referring to FIGS. 13, 13A, and 13B, a compressible seal 41, such as a rubber P-seal, may be placed between the open top container 40 and the roof 1 in the closed position. In some embodiments, the compressible seal 41 is fixed or mounted along a perimeter edge 1A of the roof 1. Compressible seal 41 may be mounted such that the seal is squeezed or compressed when the roof 1 is lowered into a locking or latched position, or upon tensioning with tensioning devices. The compression of seal 41 may act to improve leak resistance relative to a metal to metal seal.

Figure 21:
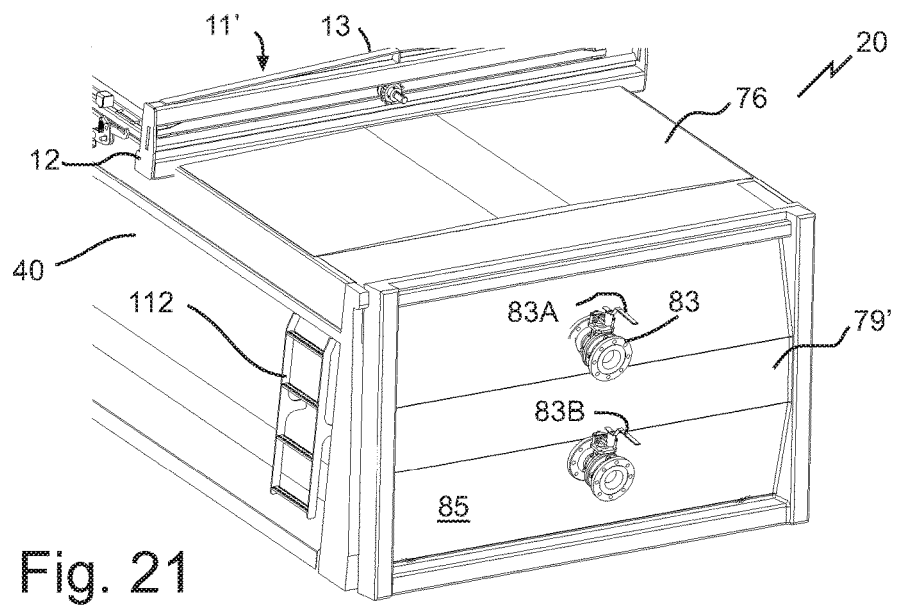
FIG. 21 is a perspective view of a rear end of the open top container of FIGS. 8A and 8B, displaying a plurality of inlet and outlet valves.

Referring to FIG. 13, the apparatus may form a gravel box. A gravel box may be adapted to receive gravel and debris from an excavator, or to haul invert or drill cuttings produced in an oil and gas drilling operation or SAGD operation. Container 40 may comprise suitable structural members for reinforcement, such as base beams 123 to provide additional ground support for container 40. In some embodiments, container 40 comprises roof panels 76 at each axial end of the roof 1. Roof panels 76, which may be fixed, permit the roof 1 length to be limited without sacrificing the length of the container 40. A roof 1 that spans for example more than ten feet, for example thirty feet or more may require greater structural support with greater length, making a longer roof 1 less economical to manufacture than a shorter roof 1. Roof 1 may have structural support members such as cross beams 153, axial beams 155, and in the example shown a truss 114. Axle 19 may be mounted in a supportive and in some cases protective housing, such as a box beam (not shown). Referring to FIG. 21, one or more ladders 112 on external surfaces of the walls of the container 40 may be provided.

Figure 22:
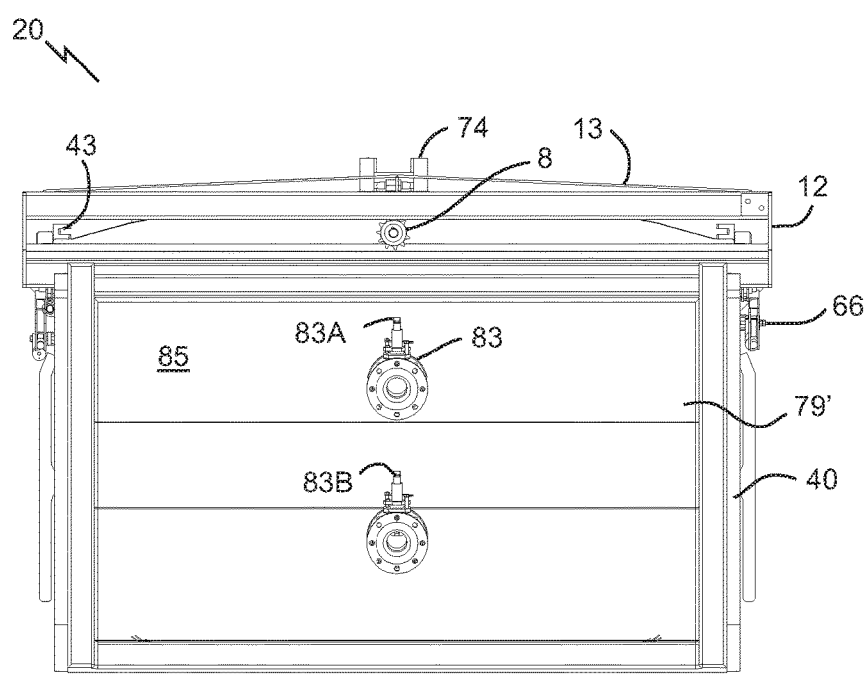
FIG. 22 is a rear end elevation view of the open top container of FIG. 21.
Figure 23:
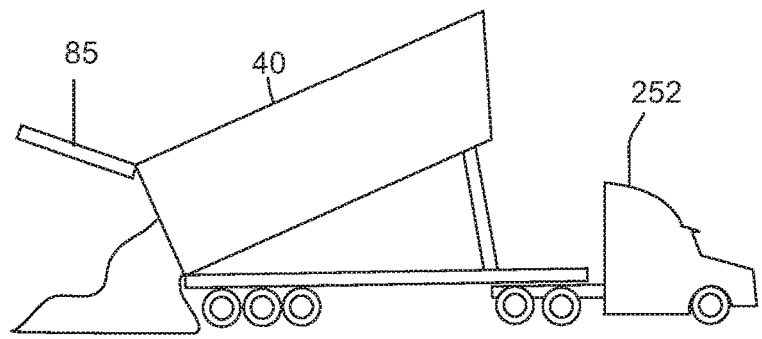
FIG. 23 is a side elevation view of the container 40 formed as an end dump unit.

Referring to FIGS. 21 and 22, apparatus 20 may have various components suitable for industrial uses, such as hauling sewage or invert from an oil or gas operation. Referring to FIGS. 22A-B and 29 apparatus 20 may be configured for end-dumping. Referring to FIGS. 22A-B a hinged tailgate or door 85 may be present at a rear end wall 79' of the open top container 40 for such a purpose. Door 85 may comprise door hinge 85A that connects to open top container 40, and hinge 85A may be horizontal, vertical or have another suitable configuration, such as a pair of doors mounted on each side wall 81 to swing laterally outwards to expose open axial end 79'. Door 85 may comprise a plurality of valves 83 spaced at different vertical levels for selectively drawing off liquids from a liquid-solid mixture in some cases prior to dumping the solids. Valves 83 may also be used for input of fluids or free flowing solids. In other cases valves 83 may be located at other suitable locations around container 40. Apparatus 20 may comprise vent boxes 85B, which may connect to piping for equalizing pressures within and outside the container 40 to avoid roof collapse when opening the door 85. A base, such as beams 123, of container 40 may be structured to be skid, trailer, or rail car mounted, or may be mounted in a larger container, and in some cases includes wheels or other ground engaging elements. The container 40 may be used with a hydraulic lift (shown as part of a tractor-trailer 252 unit), a container tilter, or other suitable tilting mechanisms for end-dumping. Referring to FIGS. 13A-B, handles 39 and hooks 43 may be provided on various parts of roof 1, for example for manually opening and closing and sliding the roof 1 and for connecting same to tensioners, respectively.

Figure 24:
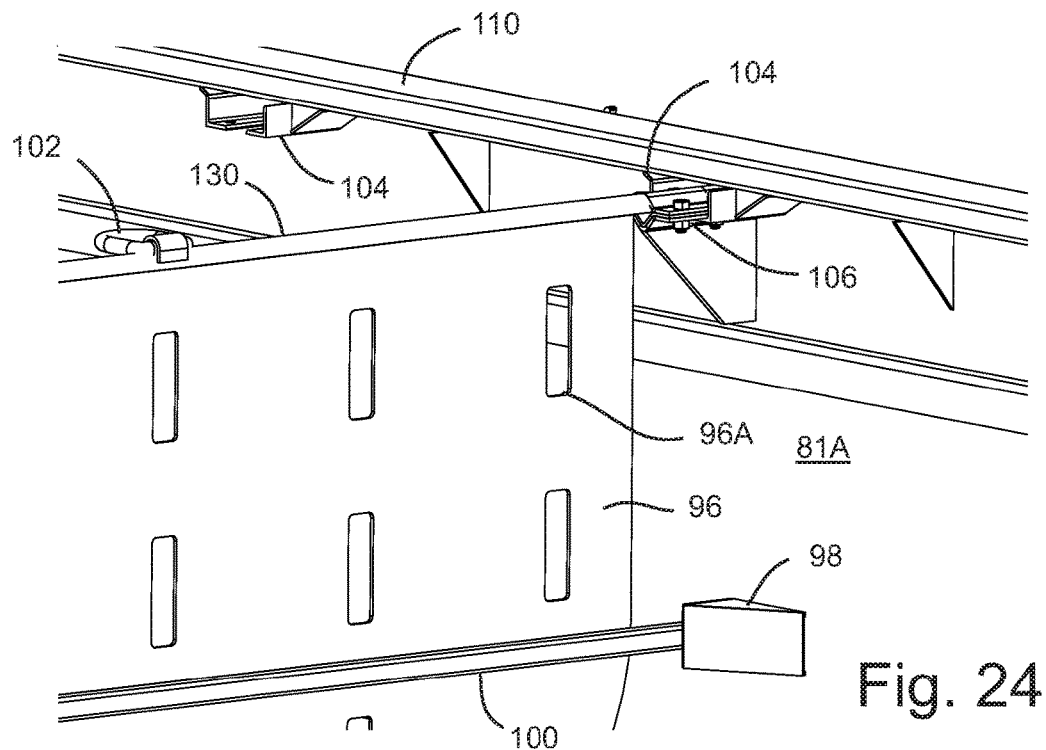
FIG. 24 is a perspective view of an interior baffle of the open top container of FIGS. 8A, 8B.
Figure 25A:
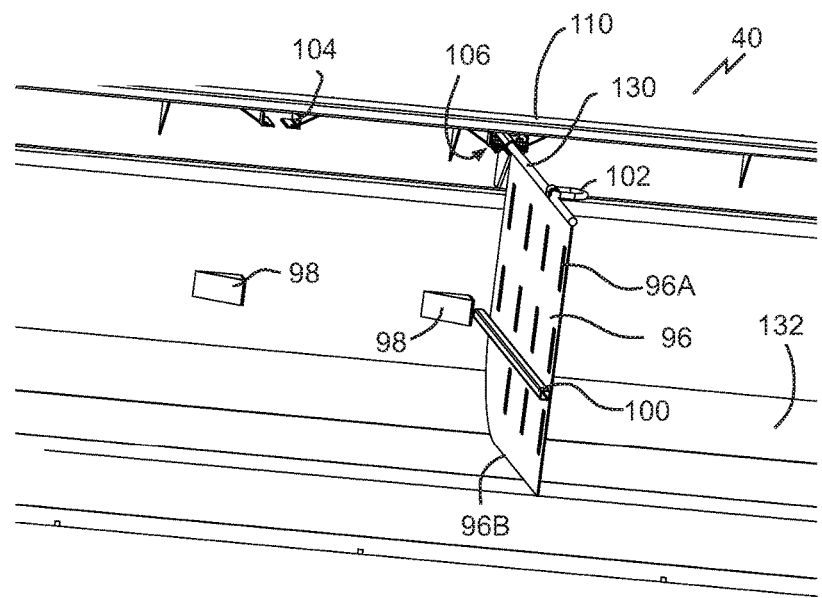
FIG. 25A is a section perspective view taken along a central plane through the open top container of FIGS. 8A and 8B displaying an internal baffle.
Figure 25B:
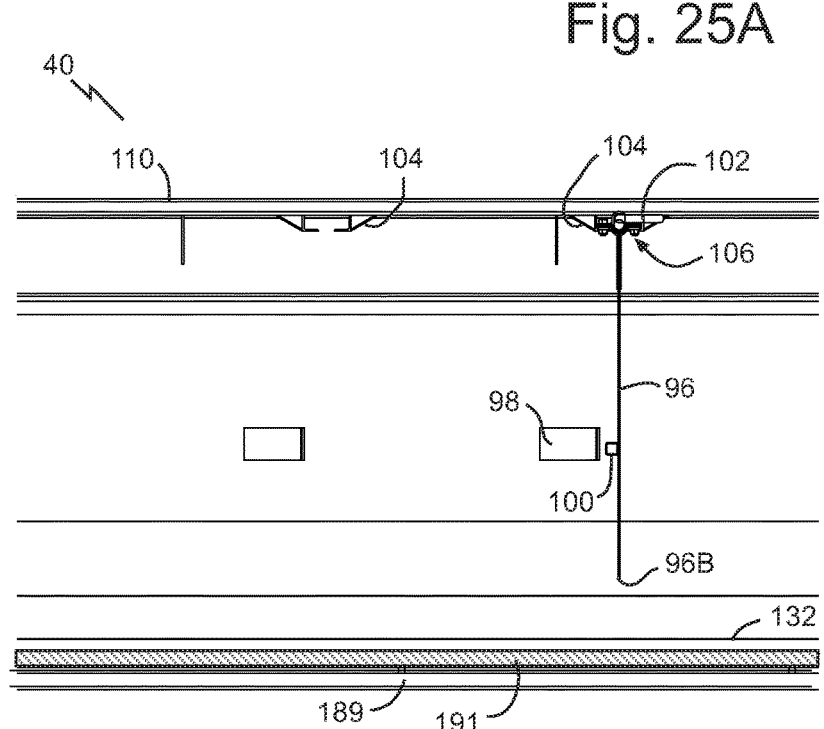
FIG. 25B is a side elevation view of the portion in FIG. 25A.
Figure 26:
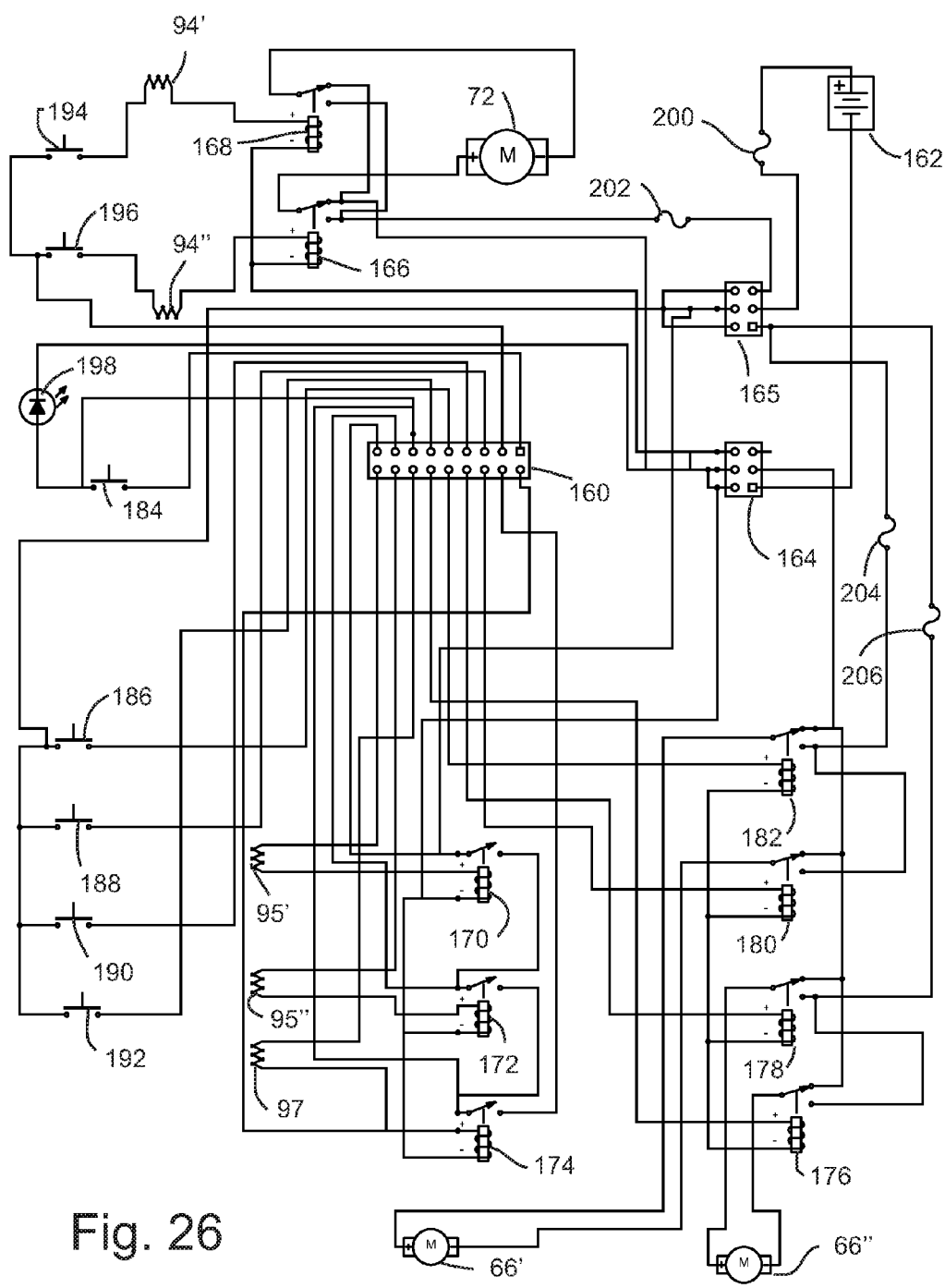
FIG. 26 is a circuit diagram for operating various parts of the apparatus of FIGS. 8A-B.

Referring to FIGS. 24 and 25A-B, open top container 40 may comprise one or more interior baffles, such as baffle plates 96. Sludge and slurry may slosh around in the container 40, making it difficult for the driver to handle the truck under various driving conditions, particularly when driving up or down a hill. Baffle plates 96 may restrict the flow of contents within the container 40 for more consistent weight distribution in container 40 and hence smoother and safer transportation. Plate 96 may define holes 96A to permit limited equalization flow of fluids through the plate 96.

Plate 96 may be pivotally mounted to container 40, for example via baffle hinge axles 130 for connecting to the inner side wall 81A of container 40. Baffle hinge axle 130 may connect to a hub 106 mounted on inner wall 81A. Hub 106 may be mounted by bracket 104 for example below a rim bar 110. Bracket 104 may be one of a plurality of brackets spaced along the length of the container 40 to permit a variety of numbers and locations of baffle plates 96 to be used within container 40. Baffle plate 96 may comprise a lifting lug such as a ring 102 for handling and moving baffle plate 96 by a suitable mechanism such as a crane (not pictured). Baffle plate 96 may comprise reinforcing members such as a cross bar 100. Cross bar 100 may extend across baffle plate 96 and may engage with stoppers 98, or other parts of plate 96 may engage stoppers, for example to prevent over rotation. When the apparatus 20 is dumped, the baffle plates 96 may be permitted to swing toward the rear end wall 79' of the apparatus to permit dumping of the contents of the container 40. Referring to FIG. 25B when in a horizontal neutral position as shown the baffle plate 96 may rest a non-zero distance above a surface of floor 132 of the container 40, to permit fluid transfer across vertical plates 96.

Referring to FIG. 25B, container 40 may be suitably insulated, for example by insulation 191. Insulation 191, such as ceramic wool blanket insulation, may be located beneath the floor 132 of the container 40, for example between floor 132 and a subfloor 189, both of which may be formed in a base of the container 40. Insulation, for example in the form an insulating gasket between floor 132 and the exterior of the container 40, adds bulk and weight but may reduce heat loss to the ambient environment, particularly during winter transport. The floor 132 may form a smooth uninterrupted surface and may form a liquid barrier seal between a fluid-receiving interior of the container 40 defined above the floor 132, and the space between the floor 132 and the sub floor 189. Referring to FIG. 22A, end cap plates 193 may seal and cover the axial ends of the space between the sub floor and floor.

Additional embodiments of an apparatus 20 will now be described. Features of one embodiment disclosed in this document may be combined with features of another embodiment, without restriction unless context dictates otherwise.

Figure 1:
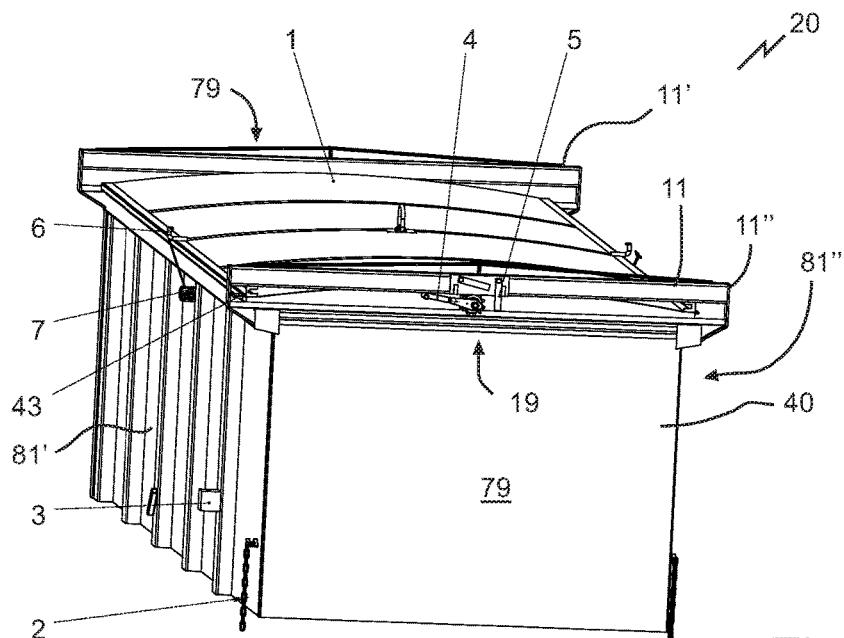
FIG. 1 is a perspective view of an open top container showing an embodiment of a rolling roof mechanism and related safety components.

Referring to FIG. 1, an open top container 40 may comprise parts for securing the roof 1 against the container 40 when the roof is open or closed, or both. Referring to FIG. 1, a tensioner such as tie-down straps 7 may be provided for securing the roof 1 against the container 40 when the roof 1 is in the closed position (FIG. 1). Some examples of tensioners include tie-down straps 7 such as a winch as shown, which may connect to a hook 6. In some embodiments, the tensioner is mounted on the side walls 81. Referring to FIG. 2, open top container 40 may comprise a lock, such as chain 2 and hook 43, for securing the roof 1 against side wall 81 of container 40 when roof 1 is in the open position. When in the vertical open position, the roof 1 may contact a stopper 3 located on an adjacent side wall 81 of the open top container 40. Block stopper 3 may act to prevent any pinch points between the adjacent sidewall 81 and tilted roof 1.

Referring to FIGS. 1, 2, 3, 3A, 5 and 5A-C, movement of the rolling roof 1 to one or either of opposed side walls may be accomplished by an actuator such as ratcheting handle 4. Ratcheting handle 4 may be connected to rotate the axle 19 relative the track 11 to slide the roof 1 along track 11. A ratcheting handle requires up to twice the amount of motion as a fixed crank to rotate the axle, yet permits the user to stand directly under the axle 19 and reciprocate the handle 4 to advance the roof 1 without having to swing the handle 4 awkwardly above a horizontal plane defined by the axle 19. Referring to FIGS. 20A1 and 20B1 ratcheting handle 4 may be connected to axle 19 by a suitable connection such as a threaded connection 49. Axle 19 may connect to ratchet cog 48 and slotted nut 28 via threaded connection 49. Other types of connections, such as non-threaded connections may be used.

Referring to FIGS. 5C and 5D, ratcheting handle 4 may be adapted to ratchet in either direction. Ratcheting handle 4 may comprise a part, such as a lever or switch bar 44, that permits the ratcheting handle to be switched between a first ratcheting direction and a second ratcheting direction. Referring to FIGS. 5C and 5D, in order to switch between ratcheting directions, handle 4 may comprise a suitable mechanism such as a locking pin 46. The user may set the locking pin 46 by turning the bar 44 to one side or the other. Turning the handle 4 may turn the pin 46A about a pivotal pin mount connection 46B. The pin 46A may slide along a slot 44D in bar 44, and a bulbed end 46D of the pin 46 may engage the lower end of a pair of axial ends of the slot 44D. The bulbed end 46D may push down against bar 44, via the action of spring 46C, to force one of a pair of teeth 44A of bar 44 into ratcheting contact with cog 48 to permit advancement of the cog relative to the bar 44 in one direction, and to bind the cog 48 and bar 44 on rotation in the other direction.

Referring to FIGS. 4 and 4A, a stopper 14 may be used to prevent displacement of the V roller 9 from track 10. Stopper 14 may be made of two parts (two bend plates with backing support), one part 14*a* connected for example welded to the container 40 and the second part 14*b* connected for example welded to the rolling roof 1. As the rolling roof 1 moves along the container 40, stopper plates (not shown) placed parallel to each other in a longitudinal direction with an acceptable gap in between, may prevent displacement of the V roller 9 from its track.

Referring to FIGS. 1, 2, 3, 3A, and 5C, a bar, such as safety bar or bars 5, may be mounted to the container 40, for example to the track 11 to prevent or restrict axle 19 from sliding the roof 1 out of the closed position. Bar 5 may be mounted to move, for example swing, into and out of an axle blocking position. Referring to FIG. 5C, while in the axle blocking position shown, safety bar 5 may prevent axle 19 from sliding the roof 1 out of the closed position. One example of an axle blocking position is where safety bar 5 hangs down across the path of the axle 19 along the track 11. The bar may indirectly block the axle 19, for example as shown where the bar 5 blocks the sprocket 8 or more precisely the hub 21 of the sprocket 8.

Referring to FIGS. 3 and 5C, the bar 5 may comprise a pair of bars 5', 5" located to the left and right of the axle 19 when the roof 1 is in the closed position. Each of the safety bars 5', 5" may hang down across a path of the axle 19 toward the left or right side wall 81', 81", respectively, of the container 40 when in a respective axle blocking position of the bar 5. Referring to FIGS. 3 and 3A, each bar 5', 5" may be mounted to swing toward the axle 19 and up out of the path of the axle 19 to move out of the respective axle blocking position, see for example bar 5' in FIG. 3A. Referring to FIG. 5C, each bar 5 may swing inward, about a respective pivot pin 5A, toward the axle 19. Such may place bar 5 up out of the path of the axle 19 to move out of the respective axle blocking position. The safety bars 5 may be built into the track assembly 11 and may be used for safety reasons such as preventing any motion of the rolling roof 1 out of the closed position.

Bars 5', 5" operate as a safety device that prevents the roof 1 from inadvertently sliding out of the closed position at a time where the roof 1 is neither strapped nor otherwise locked to the container. Such a structure may be of advantage when the container 40 is oriented out of horizontal, for example on the slope of a hill, as the bars 5 prevent the roof 1 from undesirable sliding by gravity after disengagement of any tie-down straps or other locking devices between the roof 1 and container 40. Referring to FIGS. 1 and 2, an example of the safety bar 5 in use is depicted. The right bar 5" hangs down in an axle blocking position where the axle (not shown) is prevented from sliding to the right out of the closed position. By contrast, the left bar 5' is swung upward, for example by a manual movement of the user, to open the path of the axle 19 toward the left side. Referring to FIG. 5C, apparatus 20 may comprise a pair of stops 42', 42" located to the left and right of each the pair of bars 5', 5". Stops 42 may prevent the bars from swinging outward away from the axle 19 and out of a blocking position.

Referring to FIGS. 5, and 5A, the rolling roof may include two identical assemblies (parallel tracks 11', 11", adjacent opposed ends of the container 40), one on each side of the roof 1, that are connected by axle 19, for example pipe 19B, and coupler 19A, to transmit rotation from one assembly to another. To activate the roof's longitudinal motion, only one ratcheting handle 4 may be used, for example on the front ends of the container, or ratcheting handles or other actuators may be present on both ends. Two mounted-bearings 18 may be bolted to rectangle bracket 17 which may comprise four metal plates. The bracket 17 may be used to bear axle load of the axle 19 and transmit longitudinal motion to the entire roof 1 by connection brackets 17 to structural tubing 25, 26. Since the axle 19 is fixed to brackets by flange-mounted bearings 18, the rotational motion of the unit sprocket-wheel 8 and a hub 21 may be converted to linear motion along the track 11, based on the principle of a rack and pinion gear. The V Roller 9 with inserted radial bearing 22, may also rotate with axle 19, and supports the longitudinal rolling motion of entire roof 1 by using L angle iron roller track 10 as a structural base for V roller 9.

Referring to FIGS. 5, 5A and 5B, and 6, the components of the axle and bearings are shown in section views that explore the mechanical structure of the rolling mechanism components. The ratcheting handle 4 may be tightened to the axle 19 against a hub 21 and fixed with a slotted nut 28. The sprocket-wheel 8 may sit tightly on hub 21 and the two may be welded together. The V roller 9 may be inserted with radial bearings 22 attached on the axle 19. Spacer pipes 29 may be mounted to the shaft between these components to prevent misalignment from roller track 10. The axle 19 may be connected to the coupler 19A with bolts and nuts, which may allow reassembling the rolling mechanism parts in case of necessary repairs. The coupler 19A may be connected for example welded to pipe 19B that joins the second rolling roof track assembly 11' on the other roof end. The pipe 19B may be passed inside tubing 26, that together with four brace tubings 25, two outside tubings 30, and two end caps, are used as a frame for the entire roof assembly.

Figure 6:
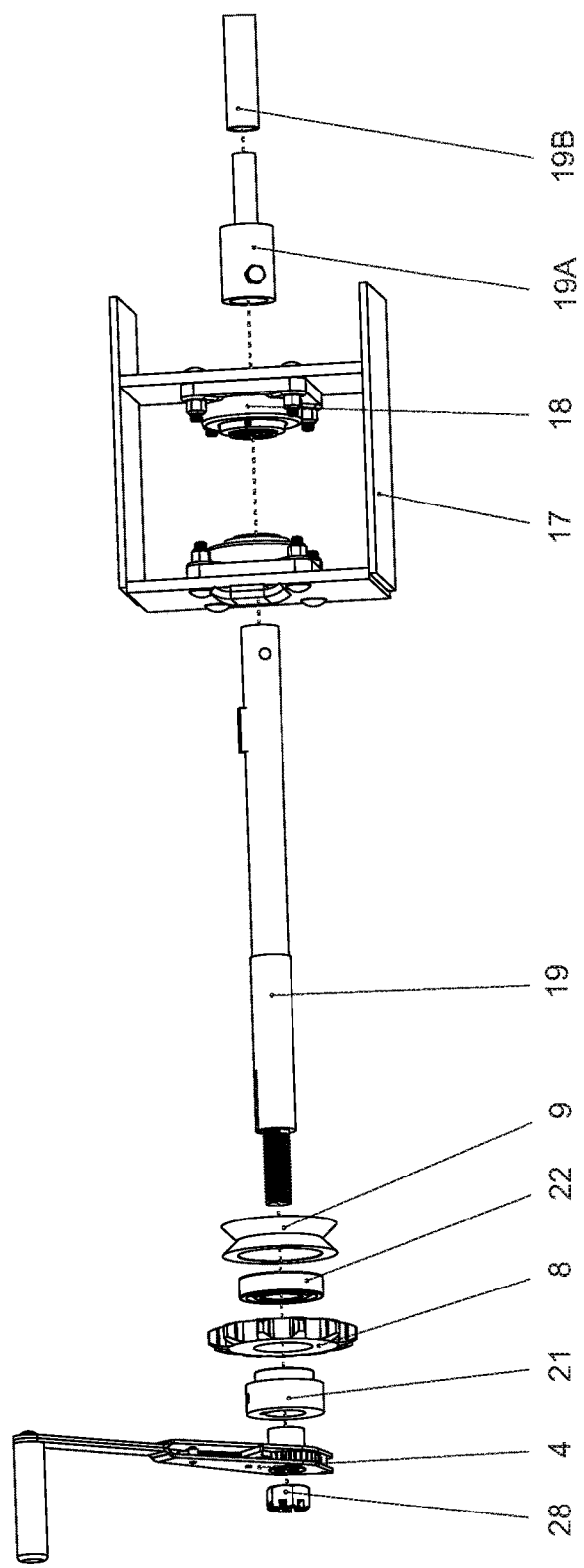
FIG. 6 is an exploded perspective view showing components of the rolling roof mechanism of FIG. 5 in order of assembly.
Figure 7B:
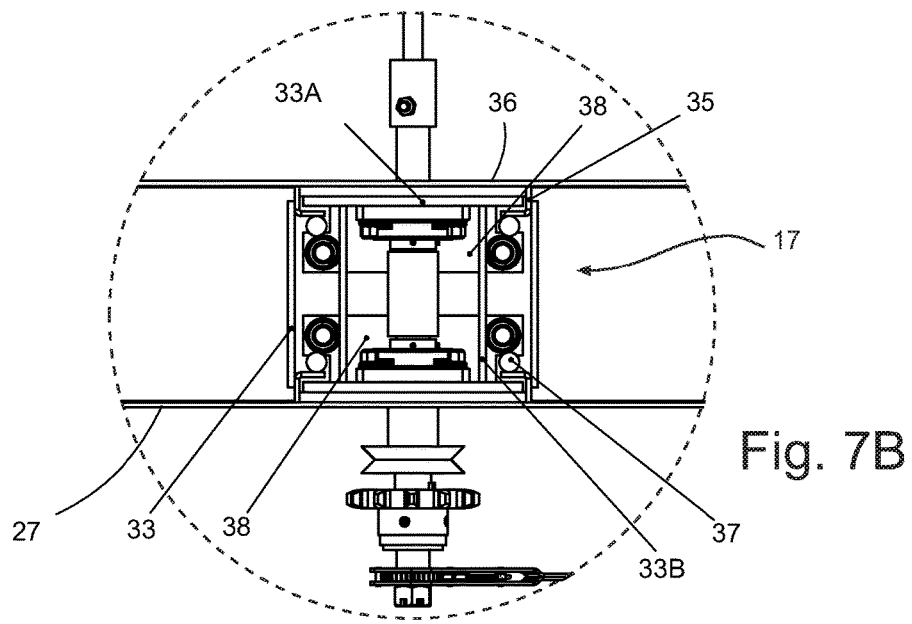
FIG. 7B is a top plan view of the bracket in FIG. 7.
Figure 7C:
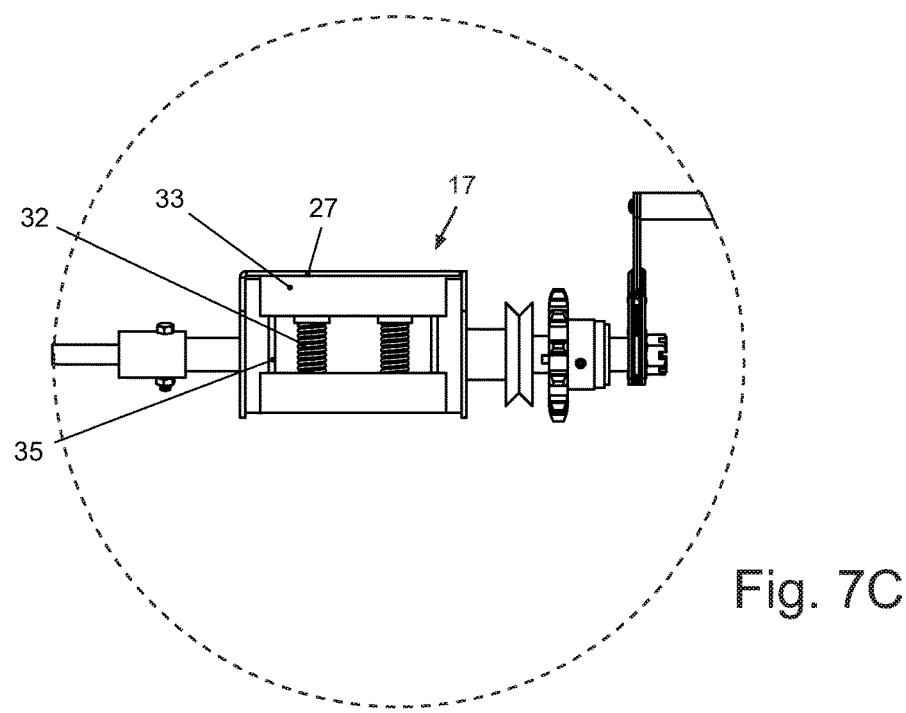
FIG. 7C is a side elevation view of metal bracket in FIG. 7.

Referring to FIG. 6, an exploded view is shown of various parts that accomplish motion of the rolling roof assembly, according to the order of assembly. As illustrated in FIG. 6, pipe 19B may be welded with a coupler 19A, whereby a rigid coupling occurs to transmit the rotation motion to the identical rolling roof assembly on other side of the roof. The coupler may be bolted together to the shaft or axle 19, and attached to ratcheting handle 4 by which this rotation is accomplished. The following parts may be mounted on the shaft or axle 19 in the order they are assembled: i) two flange-mounted bearings 18 bolted to the metal bracket 17 that comprises four plates; ii) the axle 19 slides through these bearings and attached to the coupler 19A; iii) the V roller 9 with inserted radial bearing 22; iv) the sprocket-wheel 8 with a hub 21; and v) ratcheting handle 4 with slotted nut 28.

Referring to FIGS. 5 and 5A, the rolling roof mechanism may include a metal bracket 17 with two flange-mounted bearings 18 connected to bracket 17. Bracket 17 may secure axle 19 to roof 1. Bearings, such as flange-mounted bearings 18, may permit for rotation of axle 19 during movement of roof 1. The bearings may connect to plates 17B to form the rigid frame of metal bracket 17.

Referring to FIGS. 7 and 7A-C, another embodiment of bracket 17 that mounts the axle 19 to the roof 1 to permit vertical movement between the roof 1 and axle 19 is depicted. In such embodiment, bracket 17 is used with seals 41 to seal the rolling roof for containers with hazardous liquid waste. Bracket 17 may mount a compressible part, such as a pneumatic system, leaf spring, or coiled spring 32, that mounts the axle 19 to roof 1. Compressible spring 32 may permit the roof 1 to move in a vertical direction relative to the axle 19. Bracket 17 may comprise various plates that form one of two frames that move relative to one another. Plates 33A, flange mounted bearings 18, plates 33B, plates 38, and rings 31A form a rigid first frame. Cap plates 27, 36, L-angle plates 35, spacer bars 37, rings 31B, and plates 33 form a rigid second frame. The first and second frames may be mounted to slide vertically relative to one another. A suitable range of movement may be permitted, such as around ½-1 inch, or other suitable ranges of motion, which may allow for compressing the seal 41 of the rolling roof by a suitable tensioner such as latches (not shown) or tie-down straps 7, and may make the steel container hermetically sealed.

Springs 32 (an example of a compressible part) may be aligned in position between rings 31a and 31b). The top part of the spring 32 may be connected for example welded to the ring 31b and the bottom part to the ring 31a accordingly. Since the unit of ring 31b, plates 33, flange-mounted bearings 18, axle 19, and V roller 9 are installed on the vertically rigid L angle iron, another unit of ring 31a, plate 34, plate 35, and end cap plate 27 permits the rolling roof to have the ability to move in a vertical direction relative to the axle. That allows retaining the entire bracket 17 assembly in an immovable position, until the tie-down force is applied to seal the rolling roof 1 to the frame of the open top container 40.

Words such as vertical, horizontal, up, down, above, below, top, base and others are understood to be relative and not defined relative to the flow of gravitational lines on the Earth unless context dictates otherwise. In some cases the motor 72 may be mounted to roof 1 to permit vertical movement between the motor 72 and roof 1, for example if a spring connection is between the two. The axle 19 may incorporate an actuator, such as a drive or motor, on the second longitudinal side 11g of the track 11. For example, a belt or chain drive may engage a drive sprocket on the axle 19 in such a case. In some cases the axle 19 is mounted to move in a vertical direction relative to the sprocket 8. A pair of actuators, such as one motor 72 for each end of axle 19 and each track 11', 11", may be used.

The ratchet 4 or other actuator may be used to rotate the roof 1 in some cases, for example if a manual or automatic angular lock is provided between the axle and roof 1. Side walls include front and rear walls. Motor frame 74 may extend under the track 11. In some cases features may be described by a reference numeral in the description, but then shown in the drawings with a modified reference numeral that has an ', ", alphabetical, or other suffix, and in such cases the passage in the description refers to the part identified by the modified reference numeral.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
   an open top container;
   a track mounted to the open top container between at least two opposed side walls of the open top container; the track having a first longitudinal side and a second longitudinal side, and
   a roof mounted by an axle to the track, the axle connected to an actuator having a motor whereby the actuator is positioned adjacent the first longitudinal side of the track and mounted to the roof via a support arm that anchors to the roof adjacent the second longitudinal side of the track,
   wherein the actuator connected to the axle permits the roof to, in use, slide along the track from a closed position to one of the opposed side walls of the open top container and then be rotated about the axle into an open position.

2. The apparatus of claim 1 in which the support arm forms a cantilever.

3. The apparatus of claim 1 further comprising a roof position sensor or sensors.

4. The apparatus of claim 3 in which the roof position sensor or sensors comprise a plurality of photoelectric proximity sensors.

5. The apparatus of claim 3 in which the roof position sensor or sensors comprise one or both of: a first roof position sensor mounted to the roof or open top container for detecting the open position; and a second roof position sensor mounted to the roof or open top container for detecting the closed position.

6. The apparatus of claim 3 in which the roof position sensor or sensors are connected to reduce or shut off drive output from the motor when the roof moves into the open position.

7. The apparatus of claim 3 in which the roof position sensor or sensors are connected to reduce or shut off drive output from the motor when the roof moves into the closed position.

8. The apparatus of claim 1 further comprising a lock for securing the roof in the closed position.

9. The apparatus of claim 8 in which the lock comprises respective sets of latches along the opposed side walls.

10. The apparatus of claim 9 in which each set of the respective sets of latches comprise:
    a common latch actuator;
    a plurality of pins; and
    a plurality of hooks that pivotally mount to the common latch actuator for engaging the plurality of pins.

11. The apparatus of claim 10 in which each hook of the plurality of hooks is pivotally mounted to a respective one of the opposed side walls of the open top container, and each pin of the plurality of pins are mounted to the roof.

12. The apparatus of claim 11 in which each set of the respective sets of latches have:
    an unlatched position where the plurality of hooks are positioned below a plane defined by a top perimeter rim of the open top container; and
    a latched position where the plurality of hooks engage respective pins of the plurality of pins.

13. The apparatus of claim 12 in which each hook of the plurality of hooks has a first hook part pivotally mounted to the common latch actuator, and a second hook part pivotally mounted to the first hook part and defining a hook end for engaging a respective pin of the plurality of pins.

14. The apparatus of claim 10 in which each common latch actuator comprises a drive bar mounted to a linear actuator.

15. The apparatus of claim 9 in which, when in a latched position, the respective sets of latches are structured to apply a tension between the roof and open top container to draw the roof tightly against the open top container.

16. The apparatus of claim 9 further comprising a lock position sensor or sensors.

17. The apparatus of claim 16 in which the lock position sensor or sensors comprise a plurality of photoelectric proximity sensors.

18. The apparatus of claim 16 in which the lock position sensor or sensors are connected to reduce or prevent operation of the motor when the respective sets of latches are out of an unlatched position.

19. The apparatus of claim 1 in which:
    the track forms a rack; and
    the axle comprises a pinion that rolls along and below the rack.

20. The apparatus of claim 1 in which the actuator comprises a drive shaft that mounts to the axle via a power transfer part that permits the drive shaft to move in a vertical direction relative to the axle.

21. The apparatus of claim 20 in which the power transfer part comprises a double universal joint.

22. The apparatus of claim 1 further comprising:
   a hinged door at a rear end of the open top container for dumping contents of the open top container; and
   a plurality of interior baffles within the open top container.

* * * * *